(12) United States Patent
Shoap

(10) Patent No.: US 8,016,332 B1
(45) Date of Patent: Sep. 13, 2011

(54) METHOD AND APPARATUS FOR A CRUMPLE ZONE WITH SELECTABLE VOLUME

(76) Inventor: Stephen D. Shoap, Wakefield, MA (US)

( * ) Notice: Subject to any disclaimer, the term of this patent is extended or adjusted under 35 U.S.C. 154(b) by 0 days.

(21) Appl. No.: 12/977,858

(22) Filed: Dec. 23, 2010

Related U.S. Application Data

(60) Provisional application No. 61/284,892, filed on Dec. 28, 2009.

(51) Int. Cl.
*B60R 19/22* (2006.01)

(52) U.S. Cl. ........ 293/132; 188/377; 280/753; 293/110; 293/118

(58) Field of Classification Search .......... 188/371, 188/377; 267/217; 280/742, 753, 784; 293/107, 293/109, 110, 118, 126, 127, 128, 132, 133, 293/134; 296/187.03, 187.08, 187.09, 187.11, 296/187.12
See application file for complete search history.

(56) References Cited

U.S. PATENT DOCUMENTS

| | | | |
|---|---|---|---|
| 1,347,937 A | | 7/1920 | Clary |
| 1,373,822 A | * | 4/1921 | Kleine ........................ 293/134 |
| 1,643,517 A | | 9/1927 | Price |
| 1,783,934 A | * | 12/1930 | Banschbach ................. 293/127 |
| 1,826,979 A | * | 10/1931 | Banschbach ................. 293/128 |
| 2,092,476 A | | 9/1937 | Schulman |
| 3,307,867 A | | 3/1967 | McGovern |
| 3,333,880 A | * | 8/1967 | Tavano, Sr. .................... 293/30 |
| 3,412,628 A | | 11/1968 | De Gain |
| 3,575,454 A | * | 4/1971 | Meeker ........................ 293/127 |
| 3,695,665 A | * | 10/1972 | Matsuura ...................... 293/110 |
| 3,741,560 A | * | 6/1973 | Schaller ........................ 267/134 |
| 3,759,351 A | * | 9/1973 | Purple .......................... 188/377 |
| 3,774,950 A | * | 11/1973 | Weller ........................... 293/131 |
| 3,782,768 A | | 1/1974 | Moore |
| 3,797,872 A | * | 3/1974 | Watanabe et al. ............... 293/30 |
| 3,903,997 A | * | 9/1975 | Brooks ......................... 188/377 |
| 3,960,397 A | * | 6/1976 | Janci ............................ 293/107 |
| 4,097,080 A | | 6/1978 | Petry |
| 4,099,759 A | * | 7/1978 | Kornhauser .................. 293/110 |
| 4,231,607 A | | 11/1980 | Bohlin |
| 4,272,103 A | | 6/1981 | Schmid et al. |
| 4,431,221 A | | 2/1984 | Jahnle |
| 4,474,257 A | * | 10/1984 | Lee ............................... 180/271 |
| 4,512,604 A | | 4/1985 | Maeda et al. |
| 4,830,417 A | | 5/1989 | Bates et al. |

(Continued)

FOREIGN PATENT DOCUMENTS

DE 3931475 A1 * 4/1991

*Primary Examiner* — Glenn Dayoan
*Assistant Examiner* — Paul Chenevert
(74) *Attorney, Agent, or Firm* — Hayes Soloway P.C.

(57) ABSTRACT

A container formed with a plurality of faces. An energy absorbing material is within the container. A plate is located within the container. An elongated member having a proximate end and a distal end is located with the proximate end of the elongated member proximate to the plate. A first bumper is integral with the distal end of the elongated member. A first engagement mechanism is proximate to the plate, wherein the engagement mechanism has a first position that fixes the plate to the elongated member and a second position that uncouples the plate from the elongated member. A first sensor is located to quantify a collision force on said first bumper. The sensor communicates with the first engagement mechanism whereby the position of the engagement mechanism is dependent on a quantity of the collision force sensed.

20 Claims, 19 Drawing Sheets

U.S. PATENT DOCUMENTS

| | | | | |
|---|---|---|---|---|
| 5,011,205 | A * | 4/1991 | Liu | 293/5 |
| 5,042,858 | A * | 8/1991 | Schubert et al. | 293/24 |
| 5,106,137 | A * | 4/1992 | Curtis | 293/107 |
| 5,335,951 | A * | 8/1994 | Neri et al. | 293/118 |
| 5,746,418 | A * | 5/1998 | Jansen | 267/136 |
| 6,158,556 | A * | 12/2000 | Swierczewski | 188/5 |
| 6,174,008 | B1 | 1/2001 | Kramer et al. | |
| 6,217,090 | B1 * | 4/2001 | Berzinji | 293/132 |
| 6,220,652 | B1 | 4/2001 | Browne et al. | |
| 6,224,120 | B1 * | 5/2001 | Eipper et al. | 293/118 |
| 6,302,458 | B1 | 10/2001 | Wang et al. | |
| 6,308,809 | B1 * | 10/2001 | Reid et al. | 188/377 |
| 6,312,028 | B1 * | 11/2001 | Wilkosz | 293/133 |
| 6,401,565 | B1 * | 6/2002 | Wang et al. | 74/502.4 |
| 6,409,253 | B2 | 6/2002 | Larsson et al. | |
| 6,420,803 | B1 | 7/2002 | Woodall et al. | |
| 6,460,667 | B1 | 10/2002 | Bruck et al. | |
| 6,540,275 | B1 | 4/2003 | Iwamoto et al. | |
| 6,601,873 | B1 | 8/2003 | Bartesch et al. | |
| 6,623,054 | B1 | 9/2003 | Palmquist | |
| 6,626,474 | B1 * | 9/2003 | Ameur | 293/118 |
| 6,709,035 | B1 | 3/2004 | Namuduri et al. | |
| 6,773,044 | B2 | 8/2004 | Schambre et al. | |
| 6,834,899 | B2 | 12/2004 | Lindsey | |
| 6,840,542 | B2 | 1/2005 | Kim | |
| 6,869,132 | B2 | 3/2005 | Wang et al. | |
| 6,893,079 | B1 | 5/2005 | Johnson et al. | |
| 6,908,128 | B2 | 6/2005 | Strong | |
| 6,926,322 | B2 | 8/2005 | Browne et al. | |
| 6,932,201 | B2 | 8/2005 | Akiyama et al. | |
| 6,976,718 | B2 | 12/2005 | Nakanishi | |
| 7,029,044 | B2 * | 4/2006 | Browne et al. | 293/137 |
| 7,090,288 | B2 * | 8/2006 | Suzuki et al. | 296/187.09 |
| 7,201,413 | B2 | 4/2007 | Hillekes et al. | |
| 7,210,718 | B1 | 5/2007 | Budhu | |
| 7,347,465 | B2 * | 3/2008 | Jayasuriya et al. | 293/118 |
| 7,407,191 | B2 * | 8/2008 | Urushiyama | 280/784 |
| 7,695,018 | B2 * | 4/2010 | Shoap | 280/784 |
| 7,699,347 | B2 * | 4/2010 | Shoap | 280/784 |
| 7,909,373 | B2 * | 3/2011 | Donovan | 293/119 |
| 2001/0013705 | A1 * | 8/2001 | Okamura et al. | 293/102 |
| 2005/0087972 | A1 * | 4/2005 | Urushiyama et al. | 280/784 |
| 2005/0088010 | A1 * | 4/2005 | Suzuki et al. | 296/187.03 |
| 2007/0063542 | A1 * | 3/2007 | Fong | 296/187.03 |
| 2007/0290515 | A1 * | 12/2007 | Doan | 293/119 |
| 2010/0109356 | A1 * | 5/2010 | Shoap | 293/132 |

* cited by examiner

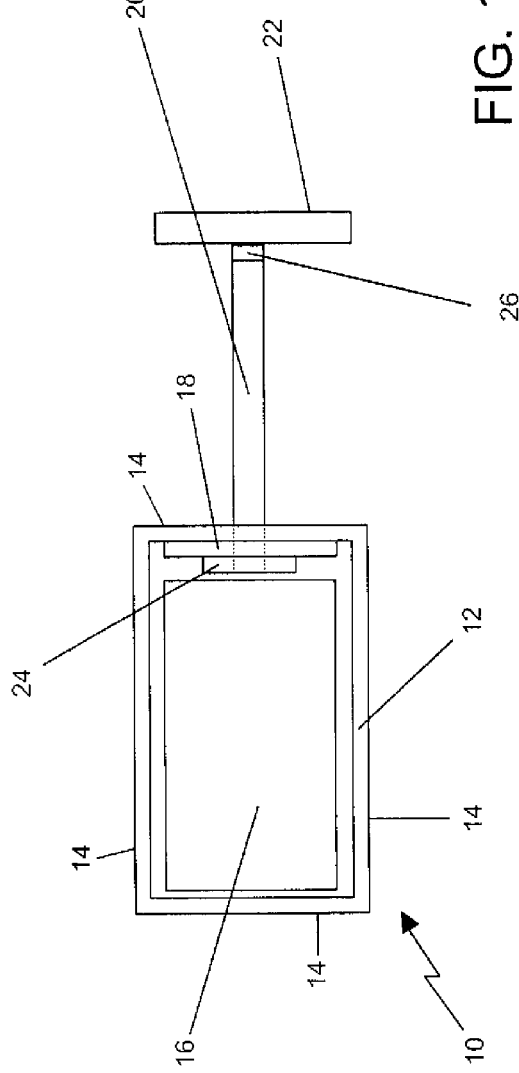
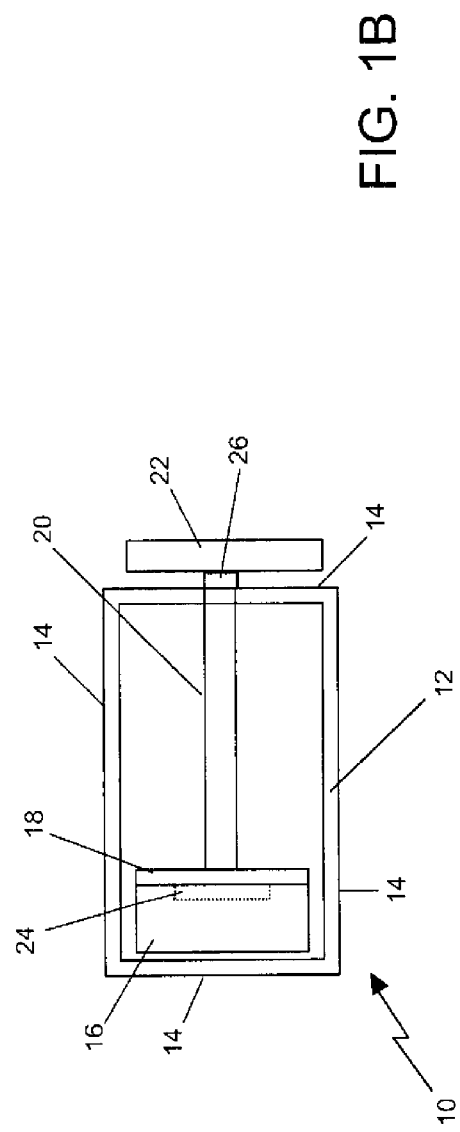
FIG. 1A
FIG. 1B

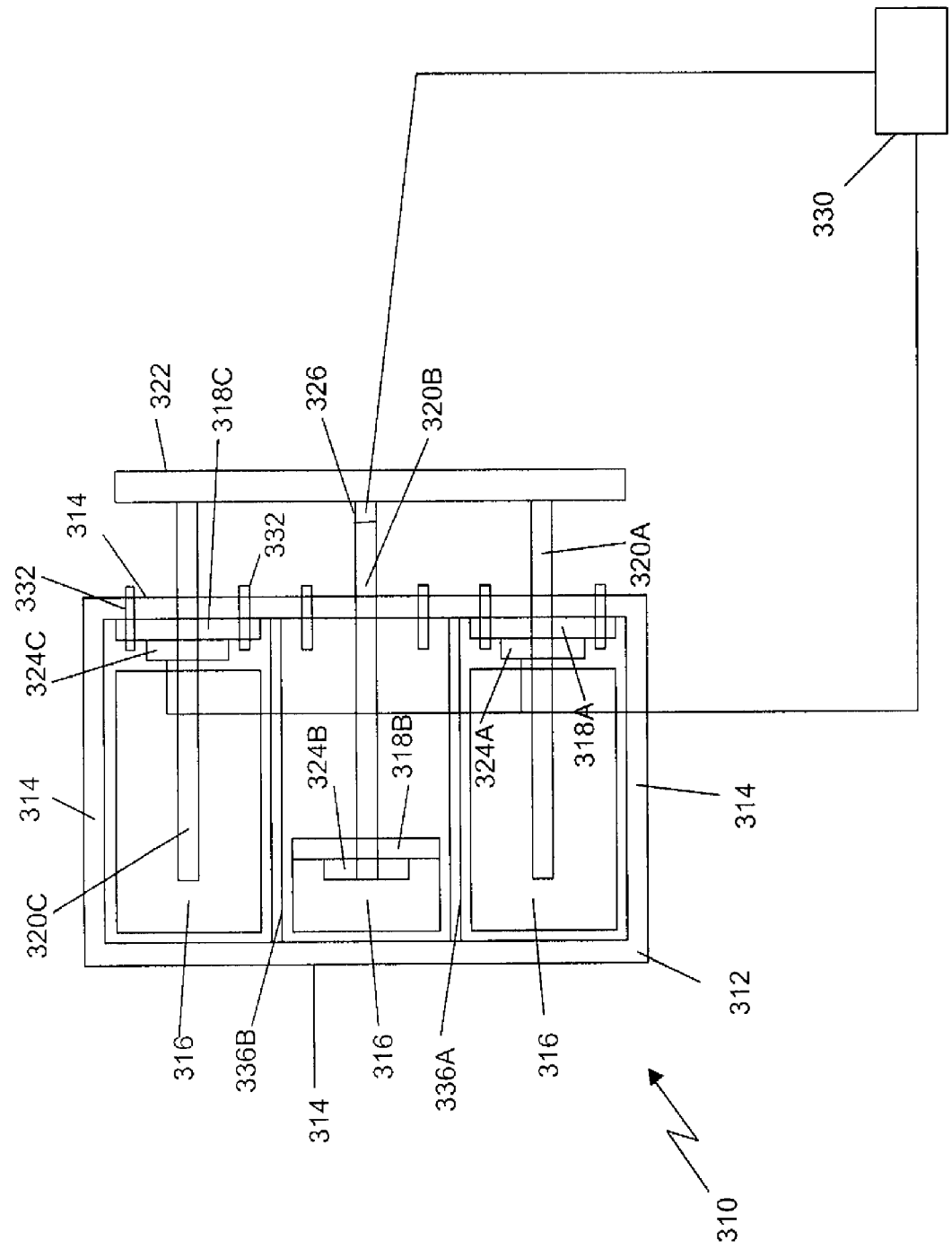

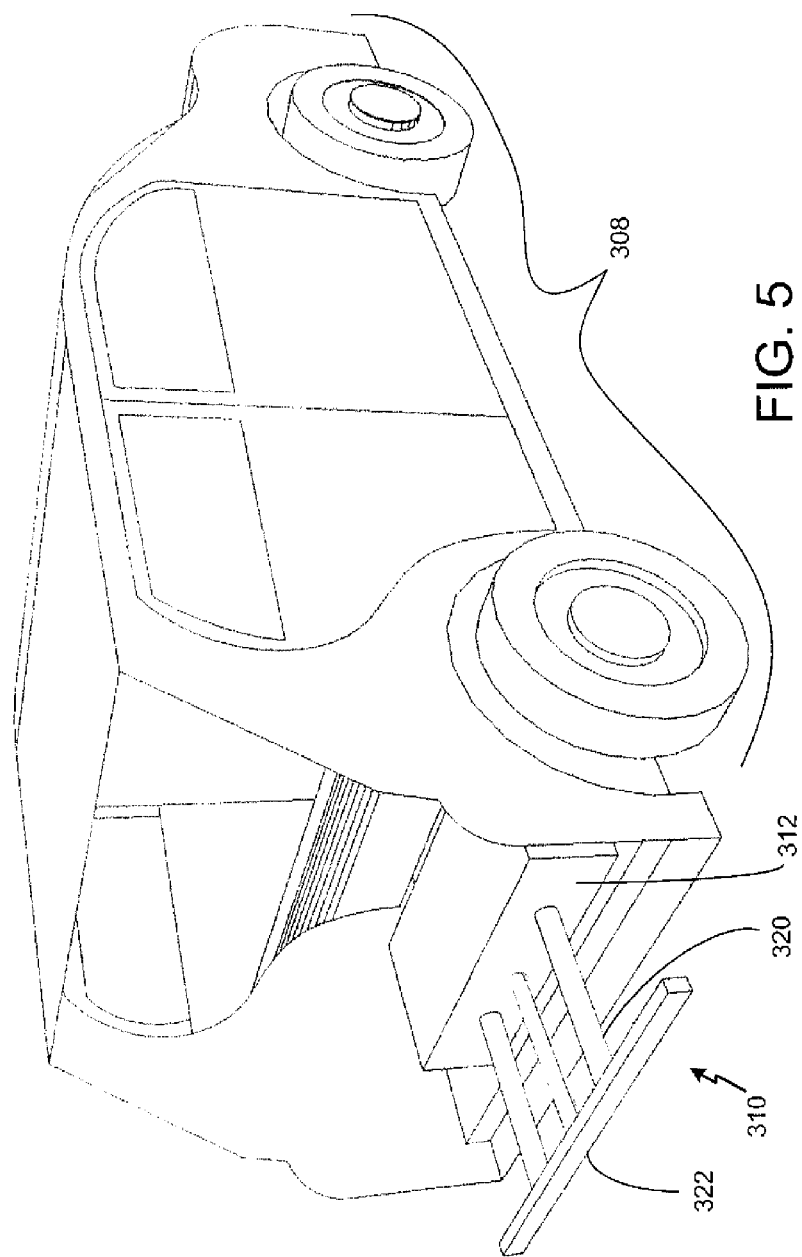

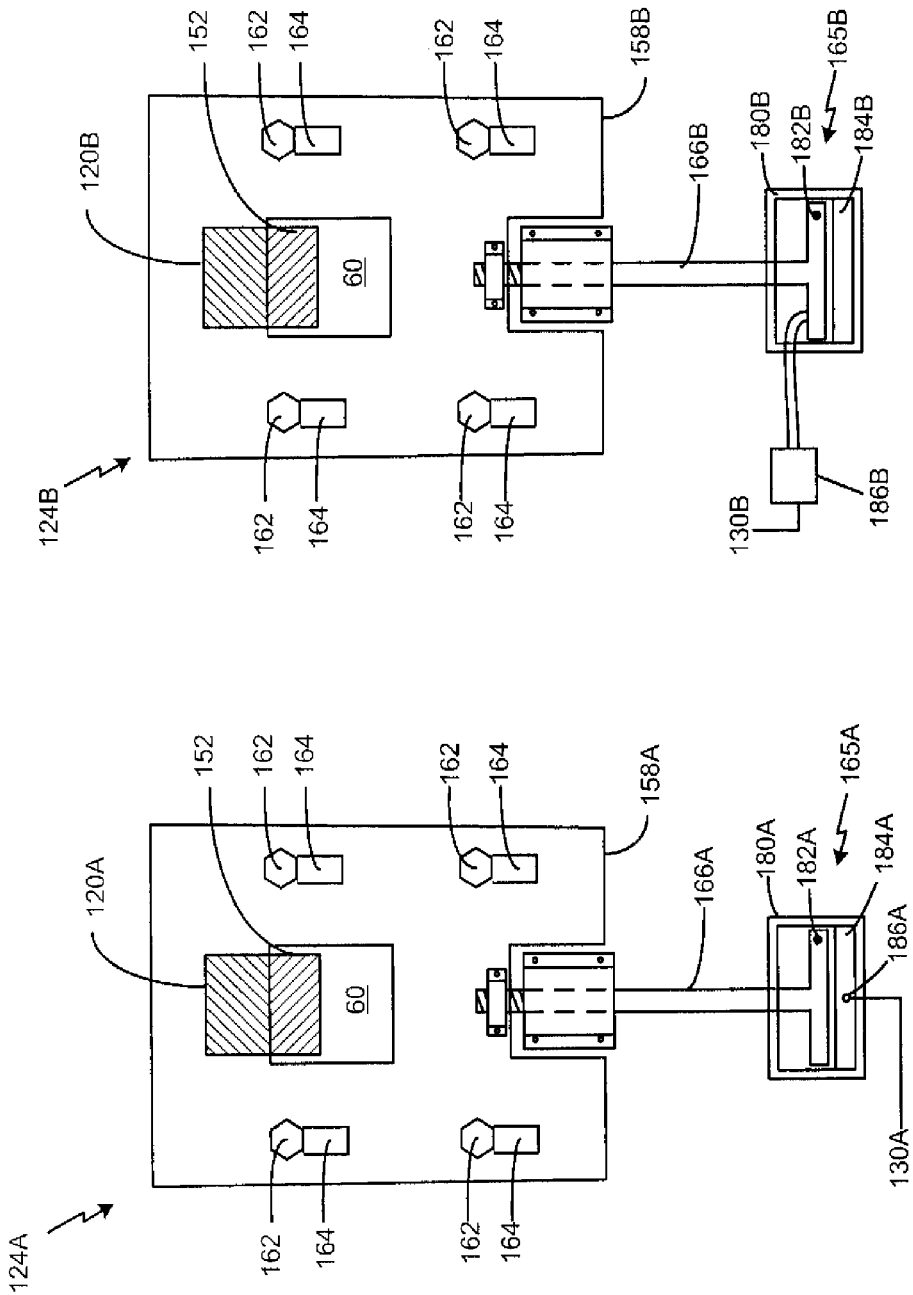

METHOD AND APPARATUS FOR A CRUMPLE ZONE WITH SELECTABLE VOLUME

CROSS REFERENCE TO RELATED APPLICATION

This application claims benefit of U.S. Provisional Application Ser. No. 61/284,892 filed Dec. 28, 2009, the entire disclosure of which is incorporated herein by reference.

FIELD OF THE DISCLOSURE

The present disclosure is generally related to vehicle safety devices and more particularly is related to a crumple zone apparatus with a selectable volume.

BACKGROUND OF THE DISCLOSURE

Auto engineers have made great improvements in reducing injuries caused by frontal collisions. Airbags and seat belts work well. Also, the front of most vehicles contains the engine and the engine compartment, which can be designed to operate as a "crumple zone". A crumple zone is a volume that absorbs at least a portion of the energy of a collision and lengthens the time of the collision event. The crumple zone presents a force in opposition to the collision force over a distance. By increasing the time of the collision event, and by absorbing a portion of the collision energy, the crumple zone reduces the G-forces on the vehicle occupants.

Rear collisions are a serious problem for small vehicles because the small vehicles do not have large trunk volumes comparable to the engine compartments. A small vehicle with a small trunk will offer little protection to the occupants when the vehicle is hit from the rear. Large vehicles typically have larger trunks, which can be designed to operate as an effective crumple zone.

Airbags are not useful in rear collisions because the occupants are in close contact with their seats. In a rear collision, the seats push on the bodies of the person in the seat. While there is some advantage to having the seats slide backwards in this situation, sliding seats is not an accepted practice because rear moving front seats could crush the legs of rear seat passengers.

With no crumple zone in the rear, the small vehicle exposes its passengers to very high G forces during rear collisions because motion of their bodies will change very rapidly. Force=Mass×Acceleration. The rapid velocity change of their bodies is a large acceleration and the resultant force on their bodies (masses) will be large. Also, a small vehicle will have a relatively small mass, and when it is hit in the rear by another vehicle while inert, the force from the collision on the low mass small vehicle will generate large accelerations, directly translating large accelerations and proportionally large forces on the passenger bodies.

Even if a passenger is constrained so that his body does not strike a hard surface, the high acceleration can tear internal organs and blood vessels. Similarly, the skull may move and compress and injure the brain.

Previous technology in this area has offered front, side and rear bumpers fixedly attached to springs in order to reduce damage to the vehicle from a collision. The springs may operate to absorb some of the force in a collision. Later technology had other shock absorbing devices that were placed between the bumpers and the vehicle. These devices were designed to dissipate some of the energy of the collision to reduce passenger injuries. Some of these devices allowed for the bumpers to be moved between multiple positions. These shock-absorbing devices were relatively small in volume, which limited the amount of energy they could absorb.

Side impact protection is a more difficult problem than frontal or rear impact protection. Vehicle sides do not traditionally have bumpers. The doors and side members of a conventional vehicle may be made from heavy gauge steel, heavier than other parts of the vehicle, in order to offer some protection for side collisions. The weight of this steel negatively affects the vehicle fuel economy.

Side airbags have been introduced to many vehicles. They are much narrower than the frontal airbags because the occupant's head is closer to the side of the vehicle than the steering wheel or dashboard. Closer proximity means that there is less time to absorb the energy of a side collision. Also, the side of a vehicle has much less steel between the passenger and an oncoming vehicle as compared to the front or rear of the vehicle and the passenger. Side collisions are much more deadly than frontal collisions.

Previous technology in this area has offered devices that were placed between the vehicle doors. They were designed to resist deformation of the vehicle chassis caused by a side collision. The devices did not extend beyond the sides of the vehicle and did not add to the side crumple distance.

Some other technology provides bumpers that remain in a retracted position until moments before an impending accident was detected. Then the bumpers would be rapidly extended. The detection of an impending accident is very difficult. There are many technologies that might be used to try to detect an impending collision, but they all suffer from the possibility of false alarms. A false alarm might injure a person who is next to the vehicle when the bumpers are deployed or cause property damage.

A bumper that can move and compress an energy absorbing material during a collision can significantly reduce the G-forces felt by passengers in a vehicle. There is, however, a problem with designing such a system. For a high-speed collision, a large volume of rigid energy absorbing material is needed. This is because of the large amount of collision energy to be absorbed. A lower speed collision may not generate enough force to begin compression of the energy absorbing material. If the large and rigid volume of energy absorbing material is not compressed during a lower speed collision, the energy absorbing material will provide no value during the lower speed collision. The vehicle passengers will feel the full G-forces that a rigid, fixed bumper would provide.

Gordon Murray is a famous British Car designer. He has recently suggested that cars designed for city driving should be designed to absorb lower speed crashes than cars designed for highways. This means that the city car is less safe on the highway because it will absorb less energy in a collision, and the passengers will suffer from higher G-forces.

Thus, a heretofore unaddressed need exists in the industry to address the aforementioned deficiencies and inadequacies.

SUMMARY OF THE DISCLOSURE

Embodiments of the present disclosure provide a system and method for absorbing impact energy. Briefly described, in architecture, one embodiment of the system, among others, can be implemented as follows. A container is formed with a plurality of faces. An energy absorbing material is within the container. A plate is located within the container. An elongated member having a proximate end and a distal end is located with the proximate end of the elongated member proximate to the plate. A first bumper is integral with the distal end of the elongated member. A first engagement mechanism is proximate to the plate, wherein the engagement mechanism has a first position that fixes the plate to the elongated member and a second position that uncouples the plate from the elongated member. A first sensor is located to quantify a collision force on said first bumper. The sensor communicates with the first engagement mechanism whereby the position of the engagement mechanism is dependent on a quantity of the collision force sensed.

The present disclosure can also be viewed as providing methods for absorbing impact energy. In this regard, one embodiment of such a method, among others, can be broadly summarized by the following steps: locating a first sensor to quantify a collision force on a first bumper at the first moments of a collision, the sensor in communication with a first engagement mechanism; communicating to the first engagement mechanism to engage a plate within a container and an elongated member, wherein the elongated member has a proximate end and a distal end and wherein the proximate end of the elongated member is proximate to the plate and the first bumper is integral with the distal end of the elongated member; receiving an impact force at the first bumper; translating the impact force from the bumper, to the elongated member and the plate; sliding the elongated member and the plate within the container; and compressing an energy absorbing material within the container between the sliding plate and one of the faces of the container if the sensor determines that the associated volume of energy absorbing material is to be selected for absorbing the energy of the collision.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several illustrations.

FIG. 1A is a cross-sectional illustration of an energy absorbing system, in accordance with the first exemplary embodiment of the present disclosure.

FIG. 1B is the cross-sectional illustration of the energy absorbing system of FIG. 1A in a post-crash position, in accordance with the first exemplary embodiment of the present disclosure.

FIGS. 4B-4D are cross-sectional illustrations of the energy absorbing system of FIG. 4A in various possible permutations of post-crash positions, in accordance with the fourth exemplary embodiment of the present disclosure.

FIG. 5 is a perspective illustration of a vehicle having the energy absorbing system illustrated in FIGS. 4A-4D, in accordance with the fourth exemplary embodiment of the present disclosure.

FIG. 10 is an illustration of a front view of an engagement mechanism similar to that shown in FIG. 7, in accordance with a first exemplary embodiment of the present disclosure.

FIG. 11 is an illustration of a front view of an engagement mechanism similar to that shown in FIG. 7, in accordance with a first exemplary embodiment of the present disclosure.

DETAILED DESCRIPTION

Figure 2A:
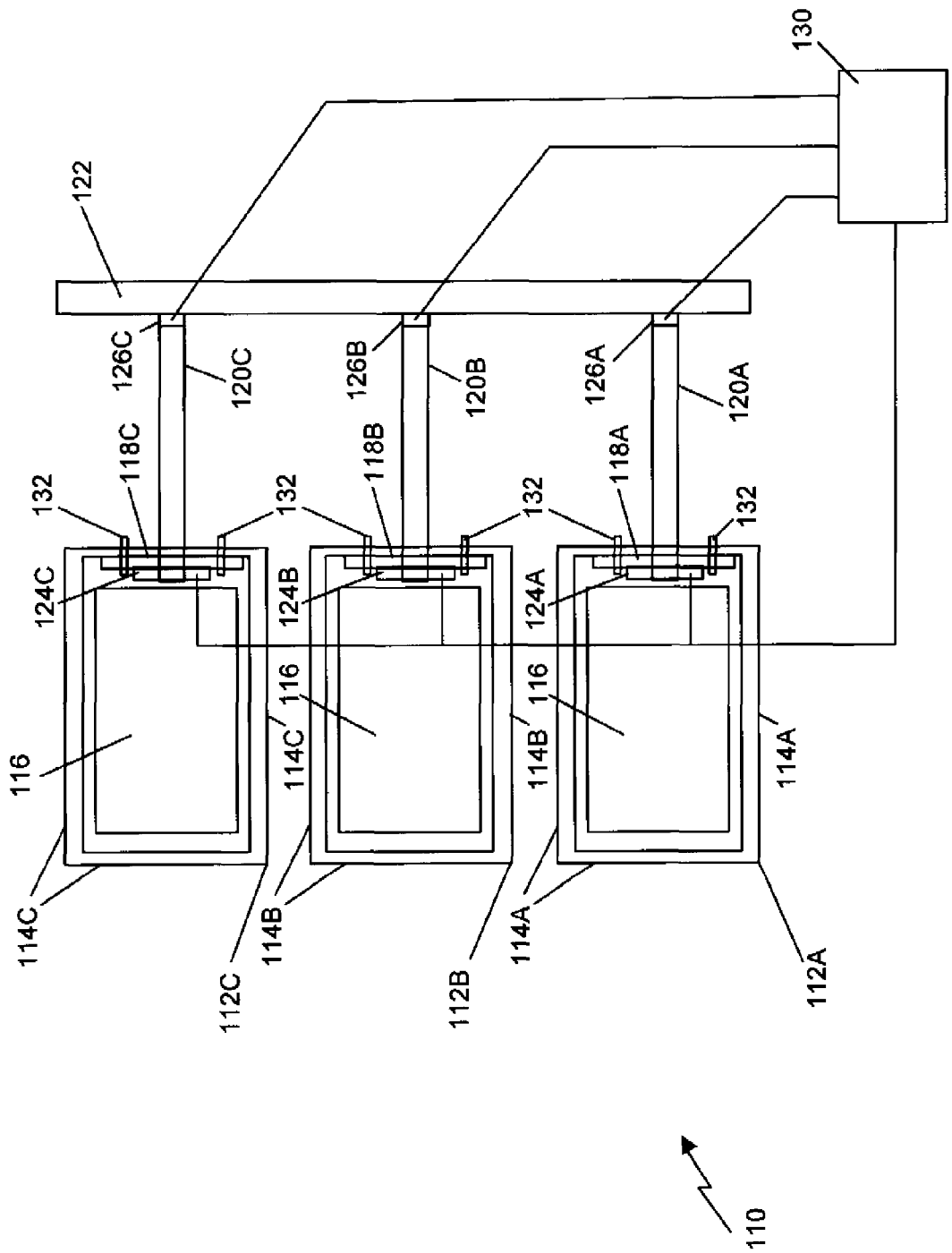
FIG. 2A is a cross-sectional illustration of an energy absorbing system, in accordance with a second exemplary embodiment of the present disclosure.

The present disclosure describes how the amount of energy absorbing material to be crushed can be matched to the intensity of the collision. This technology may allow the same vehicle to be safe in the city and on the highway. In modern vehicles, the air bags will not be fired unless a collision warrants the firing of the air bag. Many companies offer products, which are used to rapidly determine the intensity of a collision so that the air bag is fired only when needed. Air bag sensor technology, and similar technologies, can be used for selection of how much energy absorbing material to compress in a collision.

FIG. 1A is a cross-sectional illustration of an energy absorbing system 10, in accordance with the first exemplary embodiment of the present disclosure. A container 12 formed with a plurality of faces 14. An energy absorbing material 16 is within the container 12. A plate 18 is located within the container 12. An elongated member 20 having a proximate end and a distal end is located with the proximate end of the elongated member 20 proximate to the plate 18. A first bumper 22 is integral with the distal end of the elongated member 20. A first engagement mechanism 24 is proximate to the plate 18, wherein the engagement mechanism 24 has a first position that fixes the plate 18 to the elongated member 20 and a second position that uncouples the plate 18 from the elongated member 20. A first sensor 26 is located to quantify a collision force on said first bumper 22. The sensor 26 communicates with the first engagement mechanism 24 whereby the position of the engagement mechanism 24 is dependent on a quantity of the collision force sensed.

The sensor can be the type of sensor that is used by the auto industry to determine whether or not to deploy an air bag during a collision. For example, ANALOG DEVICES sells a configurable, high-G accelerometer to the auto industry for air bag control. It can measure G-forces in the range of 50-500 G's, and it has a digital two-wire interface to a microprocessor.

Another type of sensor that can be used is a strain gauge. VISHAY PRECISION GROUP sells strain gauges that measure the compression of a structural member, like a bumper shaft. The strain gauge is welded to the member, and if the member is compressed, the electrical resistance of the device is lowered. The resistance change can be converted to structural compression, which is related to the intensity of a collision.

The sensor 26 may measure the intensity of a pending or initiated collision and send the measurement to a processor which uses one or more algorithms to determine how much of the energy absorbing material 16 to compress. The sensor 26 and processor are electrical devices and they preferably perform their functions in less than a millisecond.

The engagement mechanism 24 may be a mechanical device. However, many electromagnets are currently available that can move an object several inches in less than several milliseconds, which is a desirable goal for the engagement mechanism 24 to operate, particularly in a collision with a vehicle traveling at approximately 60 miles per hour, for instance.

If more time is needed, the uses of a bumper mounted Doppler radar and/or infrared Doppler are other solutions. These systems can detect a vehicle approaching when it is a few feet away from the bumper, and Doppler signal processing can be used to estimate the speed of the oncoming vehicle. Major automobile producers are currently developing Doppler systems.

The container 12 may be a rectangular prism or any other geometric shape useful for containing impact-absorbing material. The plurality of faces 14 may include four sides, a top, and a bottom for the rectangular prism embodiment of the container 12. The energy absorbing material 16 may be any material recognized by those having ordinary skill in the art for absorbing and reducing sudden impact forces on a vehicle. The plate 18 may be an object having similar height and width dimensions to the interior of the container 12, with enough of a variation to allow the plate to slide along the depth of the container 12. The plate 18 and the elongated member 20 may be sufficiently durable to compact the energy absorbing material 16, when sufficient force is supplied to the plate 18 and the elongated member, without causing significant deformation to the plate 18. The first engagement mechanism 24 is constructed and positioned to control connecting and disconnecting the plate 18 to the elongated member 20.

In practice, when the sensor 26 senses a low impact collision, the sensor 26 signals to the first engagement mechanism 24 to uncouple the plate 18 and the elongated member 20. Uncoupled, the elongated member 20 may be displaced within the container 12, but will not translate any force to the plate 18. When the sensor 26 senses a high impact collision, the sensor signals to the first engagement mechanism 24 to fix the plate 18 to the elongated member 20. Fixed, a high impact force to the first bumper 22 is translated through the elongated member 20 to the plate 18, which is thrust against the energy absorbing material 16 to absorb some of the impact force as the plate 18 slides into the depth of the container 12. FIG. 1B is the cross-sectional illustration of the energy absorbing system 10 of FIG. 1A in a post-crash position, in accordance with the first exemplary embodiment of the present disclosure. As shown in FIG. 1B, the plate 18 is displaced, materially compacting the energy absorbing material 16. When nothing is sensed, the first engagement mechanism 24 may have a default position that either maintains the plate 18 fixed to the elongated member 20 or uncoupled from the elongated member 20 and either arrangement is within the scope of the present disclosure.

FIG. 2A is a cross-sectional illustration of an energy absorbing system 110, in accordance with a second exemplary embodiment of the present disclosure. A first container 112A is formed with a first plurality of faces 114A. A second container 112B is formed with a second plurality of faces 114B. A third container 112C is formed with a third plurality of faces 114C. An energy absorbing material 116 is within each of the containers 112A-C. A first plate 118A is located within the first container 112A. A second plate 118B is located within the second container 112B. A third plate 118C is located within the third container 112C. A first elongated member 120A having a proximate end and a distal end is located with the proximate end of the first elongated member 120A proximate to the first plate 118A. A second elongated member 120B having a proximate end and a distal end is located with the proximate end of the second elongated member 120B proximate to the second plate 118B. A third elongated member 120C having a proximate end and a distal end is located with the proximate end of the third elongated member 120C proximate to the third plate 118C.

A first bumper 122 is integral with the distal end of the first elongated member 120A, the distal end of the second elongated member 120B, and the distal end of the third elongated member 120C. A first engagement mechanism 124A is proximate to the first plate 118A, wherein the first engagement mechanism 124A has a first position that fixes the first plate 118A to the first elongated member 120A and a second position that uncouples the first plate 118A from the elongated member 120A. A second engagement mechanism 124B is proximate to the second plate 118B, wherein the second engagement mechanism 124B has a first position that fixes the second plate 118B to the second elongated member 120B and a second position that uncouples the second plate 118B from the second elongated member 120B. A third engagement mechanism 124C is proximate to the third plate 118C, wherein the third engagement mechanism 124C has a first position that fixes the third plate 118C to the third elongated member 120C and a second position that uncouples the third plate 118C from the third elongated member 120C.

A first sensor 126A is located proximate to the distal end of the first elongated member 120A to quantify a collision force on said first bumper 122 proximate to the first elongated member 120A. A second sensor 126B is located proximate to the distal end of the second elongated member 120B to quantify a collision force on said first bumper 122 proximate to the second elongated member 120B. A third sensor 126C is located proximate to the distal end of the third elongated member 120C to quantify a collision force on said first bumper 122 proximate to the third elongated member 120C. The sensors 126A-C communicate with the engagement mechanisms 124A-C through a processor 130 whereby the position of the engagement mechanisms 124A-C is dependent on a quantity of the collision forces sensed.

The containers 112A-C are shown spaced apart for illustration purposes, but may be abutting in practice. A span of the containers 112A-C must be sufficiently limited to fit on a vehicle. The containers 112A-C may have thicker outer walls and may have only a first partition separating the first container 112A and the second container 112B and a second partition separating the second container 112B and the third container 112C. The first bumper 122 may be a unitary structure, as illustrated in FIG. 2A, or it may be sectionalized into multiple units. For example, the first bumper 122 may have three distinguishable elements with each of the elongated members 120A-C connected to one of the elements of the first bumper 122, which may allow for a more optimal performance of the energy absorbing system 110. The plates 118A-C may be secured to a face of each of the containers 112A-C with breakable bolts 132. The breakable bolts 132 may be constructed to break once a minimum threshold of impact is achieved, thus avoiding compromising the energy absorbing system 110 through a series of inconsequential bumps to the first bumper 122.

Figure 2B:
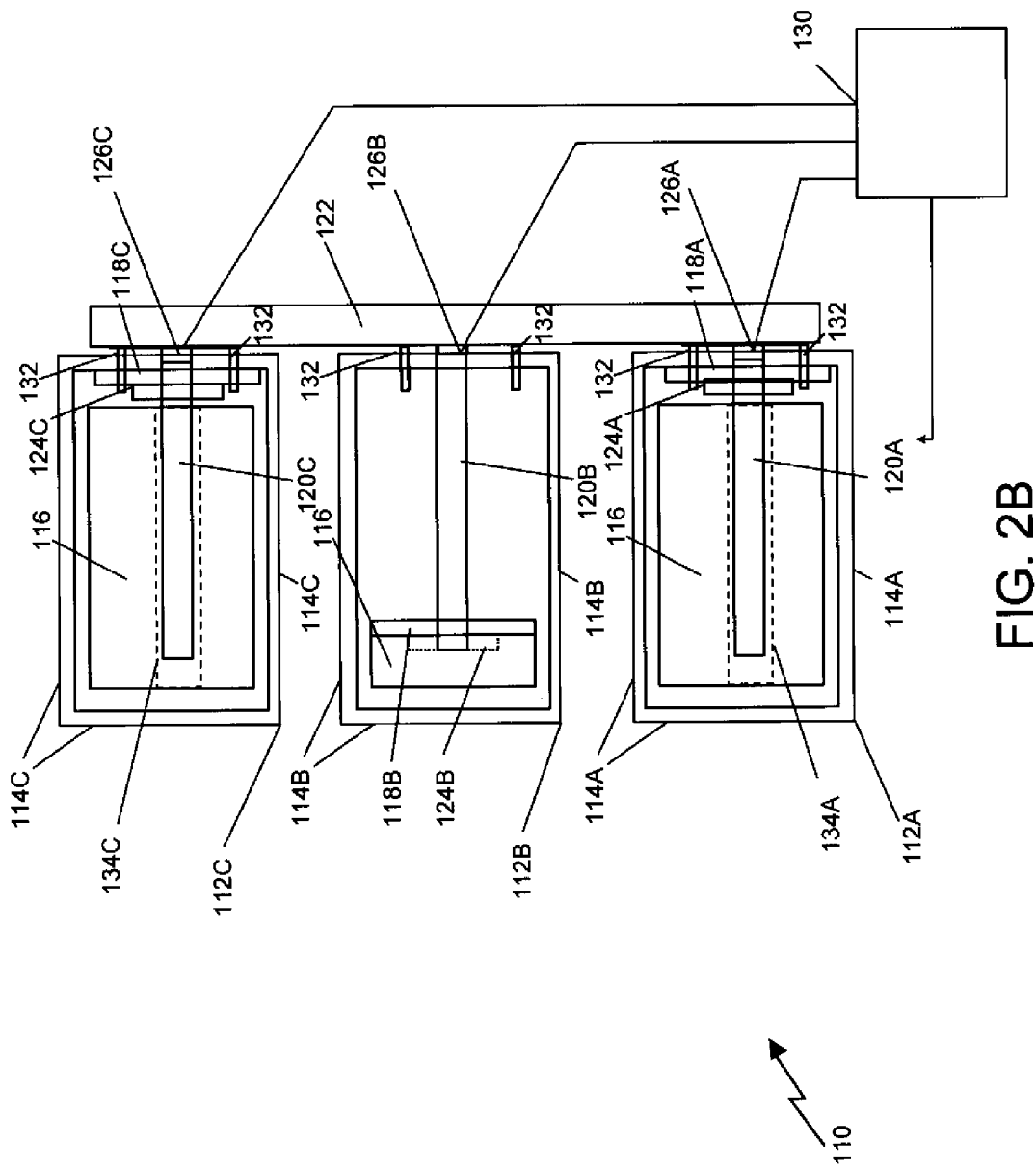
FIGS. 2B-2D are cross-sectional illustrations of the energy absorbing system of FIG. 2A in various possible permutations of post-crash positions, in accordance with the second exemplary embodiment of the present disclosure.
Figure 2C:
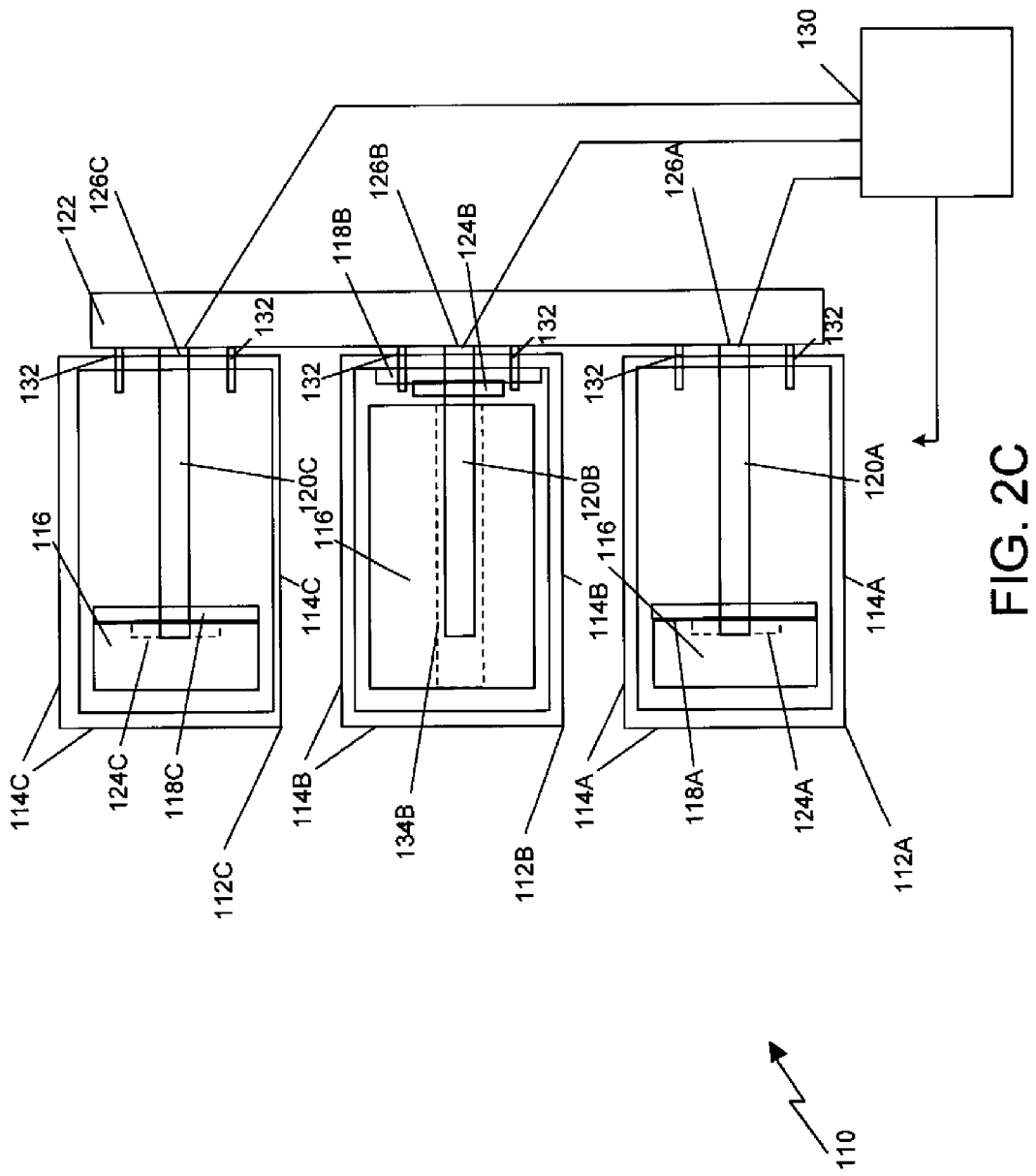
Figure 2D:
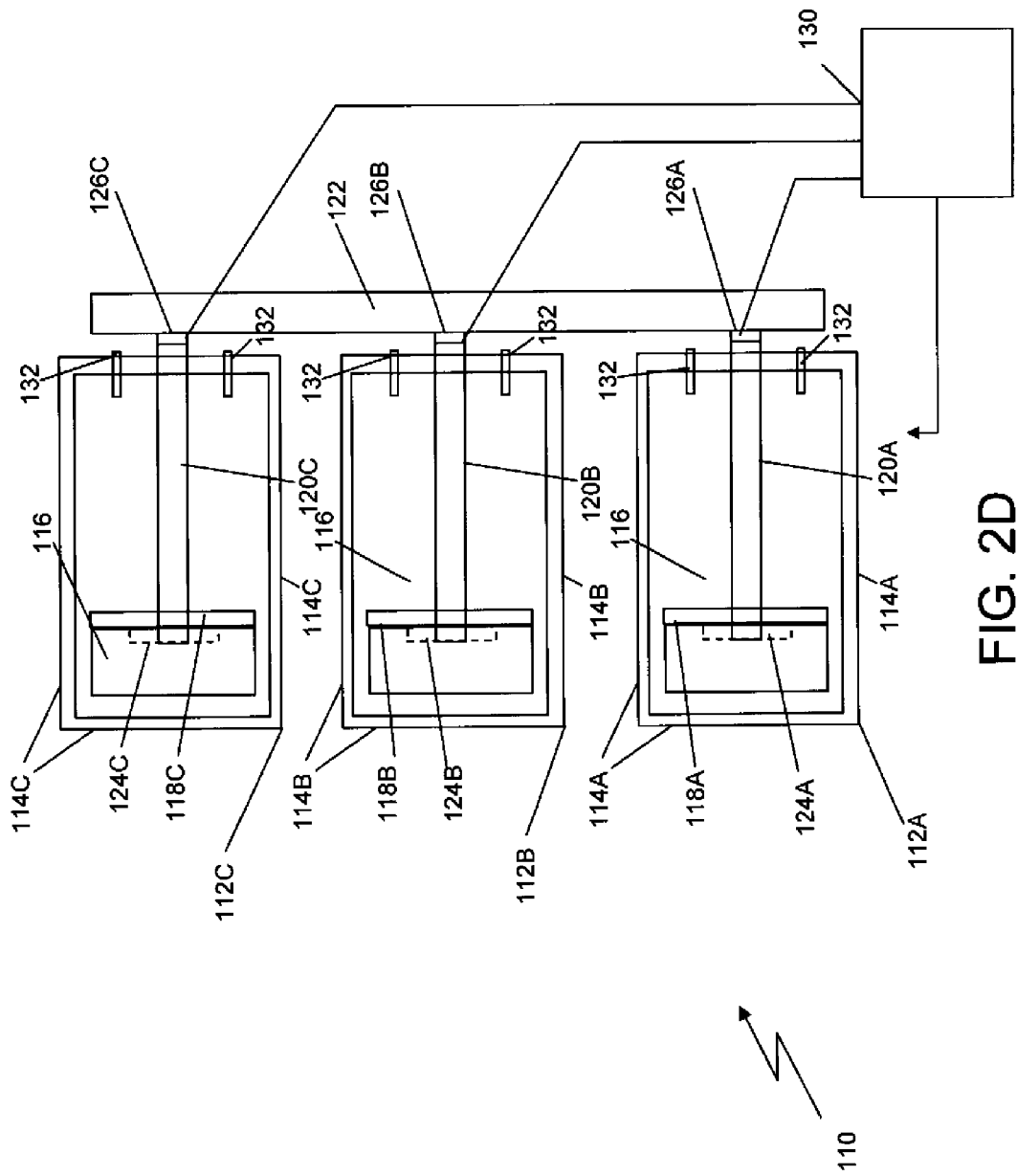

FIGS. 2B-2D are cross-sectional illustrations of the energy absorbing system of FIG. 2A in various possible permutations of post-crash positions, in accordance with the second exemplary embodiment of the present disclosure. As shown by a first permutation of post-crash positions illustrated in FIG. 2B, the sensors 126A-C communicated to the processor 130 sensed data that was indicative of an initial stage of a lower speed collision. The processor 130 communicated with the engagement mechanisms 124A-C such that the second engagement mechanism 124B was put in the first position fixed with the second plate 1188 and the first and third engagement mechanisms 124A,C were put in the second position uncoupled from the first and third plates 118A,C. As a result, the energy absorbing material 116 within the second container 112B is compressed by the second plate 118B, while the first and third elongated members 120A,C bypassed the first and third plates 118A,C and passed through a pre-manufactured narrow channel or formed a narrow channel in 134A,C in the energy absorbing material 116.

As shown by a second permutation of post-crash positions illustrated in FIG. 2C, the sensors 126A-C communicated to the processor 130 sensed data that was indicative of an initial stage of a higher speed collision. The processor 130 communicated with the engagement mechanisms 124A-C such that the second engagement mechanism 124B was put in the second position uncoupled with the second plate 118B and the first and third engagement mechanisms 124A,C were put in the first position fixed with the first and third plates 118A,C. As a result, the energy absorbing material 116 within the first and third containers 112A,C is compressed by the first and third plates 118A,C, while the second elongated member 120B bypassed the second plate 118B and passed through or formed a channel 134B in the energy absorbing material 116. The permutation illustrated in FIG. 2C would be appropriate for a higher impact collision than the permutation illustrated in FIG. 2B.

As shown by a third permutation of post-crash positions illustrated in FIG. 2D, the sensors 126A-C communicated to the processor 130 sensed data that was indicative of an initial stage of a very high speed collision. The processor 130 communicated with the engagement mechanisms 124A-C such that all the engagement mechanisms 124A-C were put in the first position fixed with all the plates 118A-C. As a result, the energy absorbing material 116 within all the containers 112A-C is compressed by the plates 118A-C. The permutation illustrated in FIG. 2D would be appropriate for a higher impact collision than the permutation illustrated in FIG. 2C.

While FIGS. 2A-D shows all three plates 118A-C having engagement with the elongated members 120A-C controlled by the engagement mechanisms 124A-C, one of the three plates 118A-C may be fixed and/or integral with its respective elongated member 120A-C. For instance, it may not be desirable to ever have all three plates 118A-C uncoupled from the elongated members 120A-C at any given time. Thus, it may not be desirable to design all three plates 118A-C to be uncoupleable. One having ordinary skill in the art would understand how to make an integral connection between one of the plates 118A-C and one of the elongated members 120A-C.

Figure 3A:
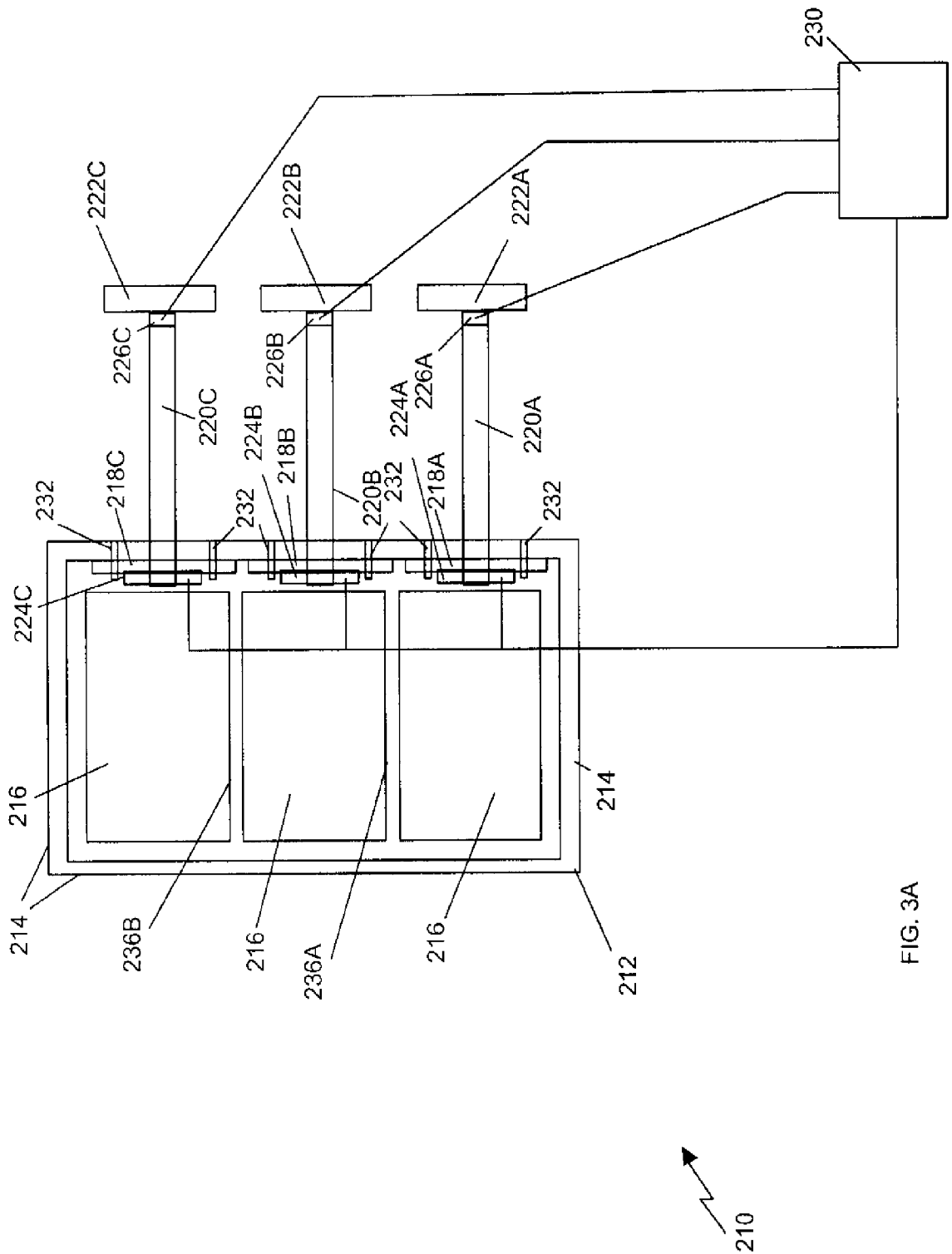
FIG. 3A is a cross-sectional illustration of an energy absorbing system, in accordance with a third exemplary embodiment of the present disclosure.

FIG. 3A is a cross-sectional illustration of an energy absorbing system 210, in accordance with a third exemplary embodiment of the present disclosure. A container 212 is formed with a first plurality of faces 214. The container 212 includes a first partition 236A and a second partition 236B partitioning three sections within the container 212. An energy absorbing material 216 is within each section of the containers 212. A first plate 218A is located within the first section of the container 212. A second plate 218B is located within the second section of the container 212. A third plate 218C is located within the third section of the container 212. A first elongated member 220A having a proximate end and a distal end is located with the proximate end of the first elongated member 220A proximate to the first plate 218A. A second elongated member 220B having a proximate end and a distal end is located with the proximate end of the second elongated member 220B proximate to the second plate 218B. A third elongated member 220C having a proximate end and a distal end is located with the proximate end of the third elongated member 220C proximate to the third plate 218C.

A first bumper 222A is integral with the distal end of the first elongated member 220A. The second bumper 222B is integral with the distal end of the second elongated member 220B. The third bumper 222C is integral with the distal end of the third elongated member 220C. A first engagement mechanism 224A is proximate to the first plate 218A, wherein the first engagement mechanism 224A has a first position that fixes the first plate 218A to the first elongated member 220A and a second position that uncouples the first plate 218A from the elongated member 220A. A second engagement mechanism 224B is proximate to the second plate 218B, wherein the second engagement mechanism 224B has a first position that fixes the second plate 218B to the second elongated member 220B and a second position that uncouples the second plate 218B from the second elongated member 220B. A third engagement mechanism 224C is proximate to the third plate 218C, wherein the third engagement mechanism 224C has a first position that fixes the third plate 218C to the third elongated member 220C and a second position that uncouples the third plate 218C from the third elongated member 220C.

A first sensor 226A is located proximate to the first bumper 222A to quantify a collision force on said first bumper 222A. A second sensor 226B is located proximate to the second bumper 222B to quantify a collision force on said second bumper 222B. A third sensor 226C is located proximate to the third bumper 222C to quantify a collision force on said third bumper 222C. The sensors 226A-C communicate with the engagement mechanisms 224A-C through a processor 230 whereby the position of the engagement mechanisms 224A-C is dependent on a quantity of the collision forces sensed.

The container 212 is shown divided by partitions 236A-B. A span of the container 212 must be sufficiently limited to fit on a vehicle. The container 212 may have thicker faces 214 than partitions 236A-B. In some designs, the partitions 236A-B may be removed such that the energy absorbing material 216 is undivided. If desired, the energy absorbing materials may be divided. The bumper 222A-C may be joined to form a unitary structure. The plates 218A-C may be secured to a face 214 of the container 212 with breakable bolts 232. The breakable bolts 232 may be constructed to break once a desired threshold of impact is achieved, thus avoiding compromising the energy absorbing system 210 through a series of inconsequential bumps to the bumpers 222A-C.

Figure 3B:
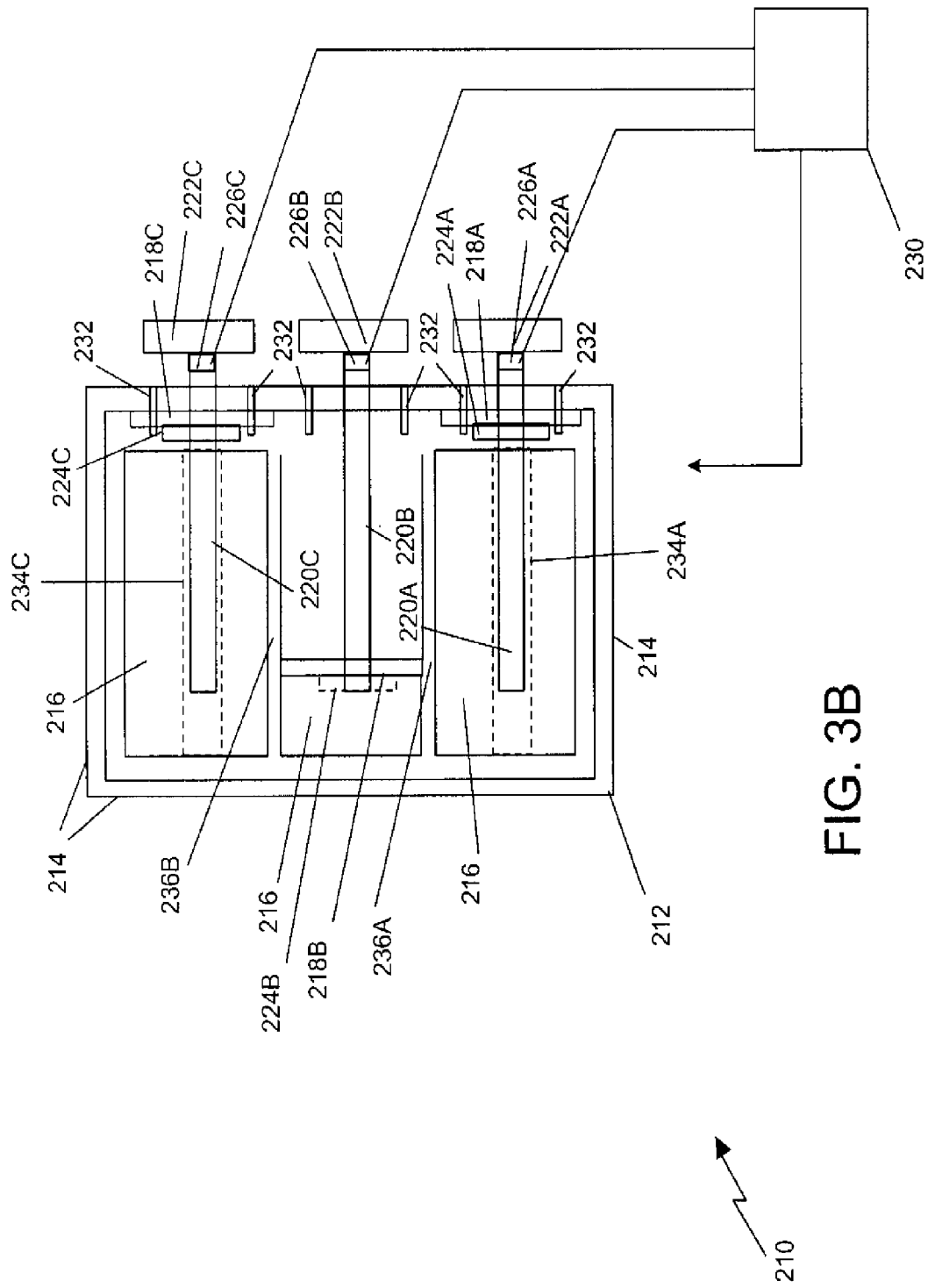
FIGS. 3B-3D are cross-sectional illustrations of the energy absorbing system of FIG. 3A in various possible permutations of post-crash positions, in accordance with the third exemplary embodiment of the present disclosure.
Figure 3C:
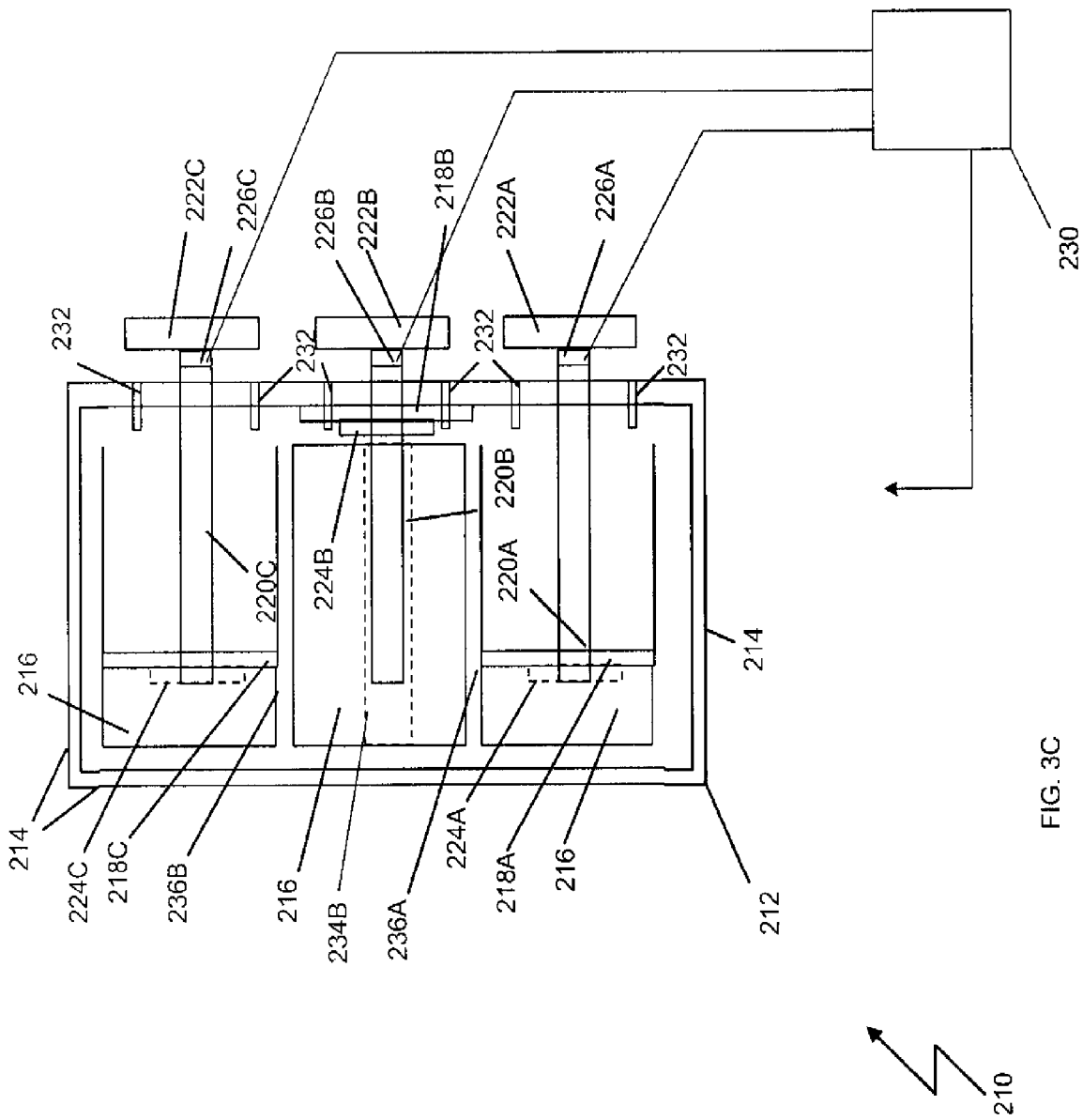
Figure 3D:
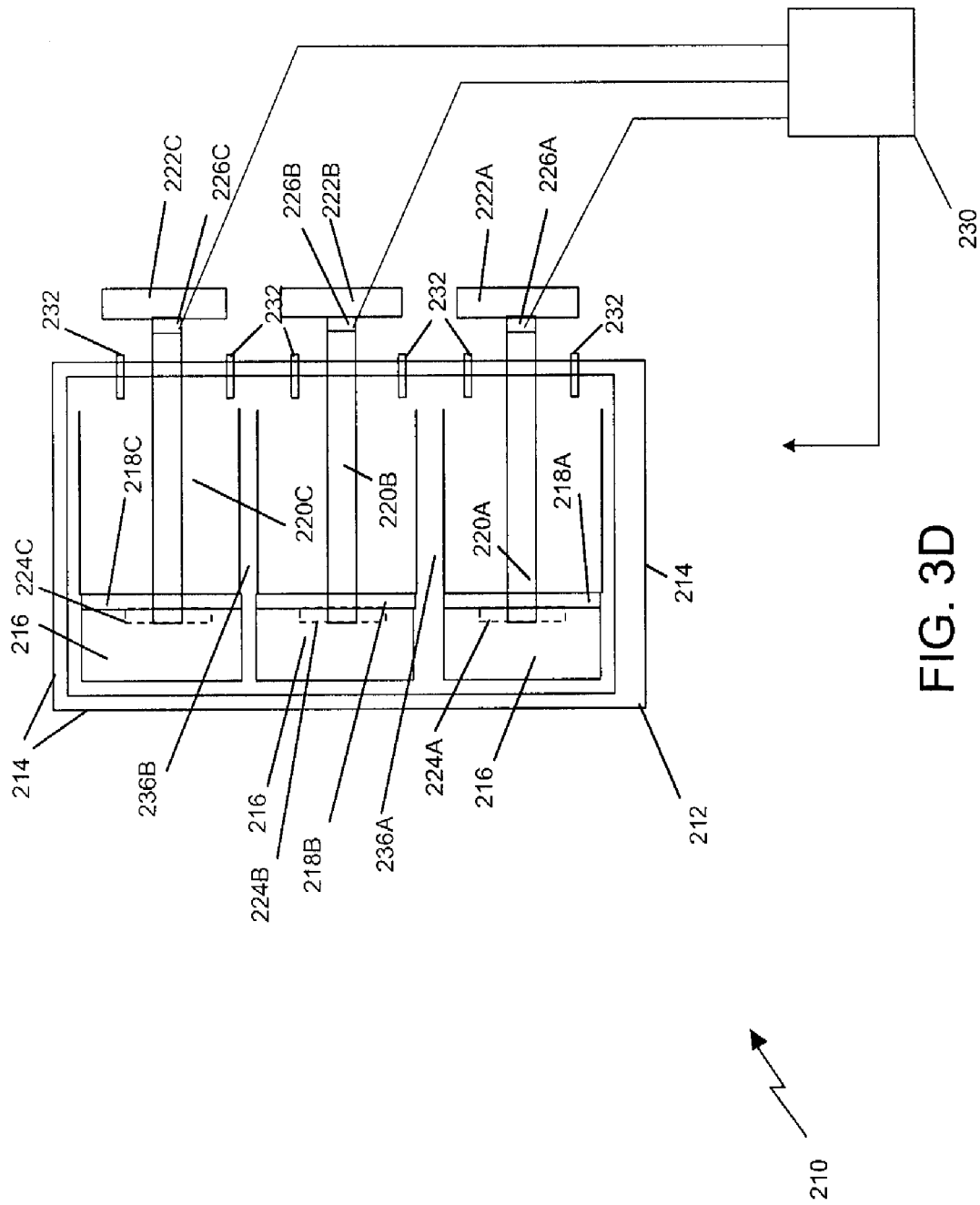

FIGS. 3B-3D are cross-sectional illustrations of the energy absorbing system 210 of FIG. 3A in various possible permutations of post-crash positions, in accordance with the third exemplary embodiment of the present disclosure. As shown by a first permutation of post-crash positions illustrated in FIG. 3B, the sensors 226A-C communicated to the processor 230 sensed data that was indicative of a lower speed collision. The processor 230 communicated with the engagement mechanisms 224A-C such that the second engagement mechanism 224B was put in the first position fixed with the second plate 218B and the first and third engagement mechanisms 224A,C were put in the second position uncoupled from the first and third plates 218A,C. As a result, the energy absorbing material 216 before the second plate 218B is compressed while the first and third elongated members 220A,C bypassed the first and third plates 218A,C and passed through or formed a channel 234A,B in the energy absorbing material 216.

As shown by a second permutation of post-crash positions illustrated in FIG. 3C, the sensors 226A-C communicated to the processor 230 sensed data that was indicative of a higher speed collision. The processor 230 communicated with the engagement mechanisms 224A-C such that the second engagement mechanism 224B was put in the second position uncoupled with the second plate 218B and the first and third engagement mechanisms 224A,C were put in the first position fixed with the first and third plates 218A,C. As a result, the energy absorbing material 216 before the first and third plates 218A,C is compressed while the second elongated member 220B bypassed the second plate 218B and passed through or formed a channel 234B in the energy absorbing material 216. The permutation illustrated in FIG. 3C would be appropriate for a higher impact collision than the permutation illustrated in FIG. 3B.

As shown by a third permutation of post-crash positions illustrated in FIG. 3D, the sensors 226A-C communicated to the processor 230 sensed data that was indicative of a very high speed collision. The processor 230 communicated with the engagement mechanisms 224A-C such that all the engagement mechanisms 224A-C were put in the first position fixed with all the plates 218A-C. As a result, all of the energy absorbing material 216 within the container 212 is compressed by the plates 218A-C. The permutation illustrated in FIG. 3D would be appropriate for a higher impact collision than the permutation illustrated in FIG. 3C.

While FIGS. 3A-D shows all three plates 218A-C having engagement with the elongated members 220A-C controlled by the engagement mechanisms 224A-C, one of the three plates 218A-C may be fixed and/or integral with its respective elongated member 220A-C. For instance, it may not be desirable to ever have all three plates 218A-C uncoupled from the elongated members 220A-C at any given time. Thus, it may not be desirable to design all three plates 218A-C to be uncoupleable. One having ordinary skill in the art would understand how to make an integral connection between one of the plates 218A-C and one of the elongated members 220A-C.

Figure 4A:
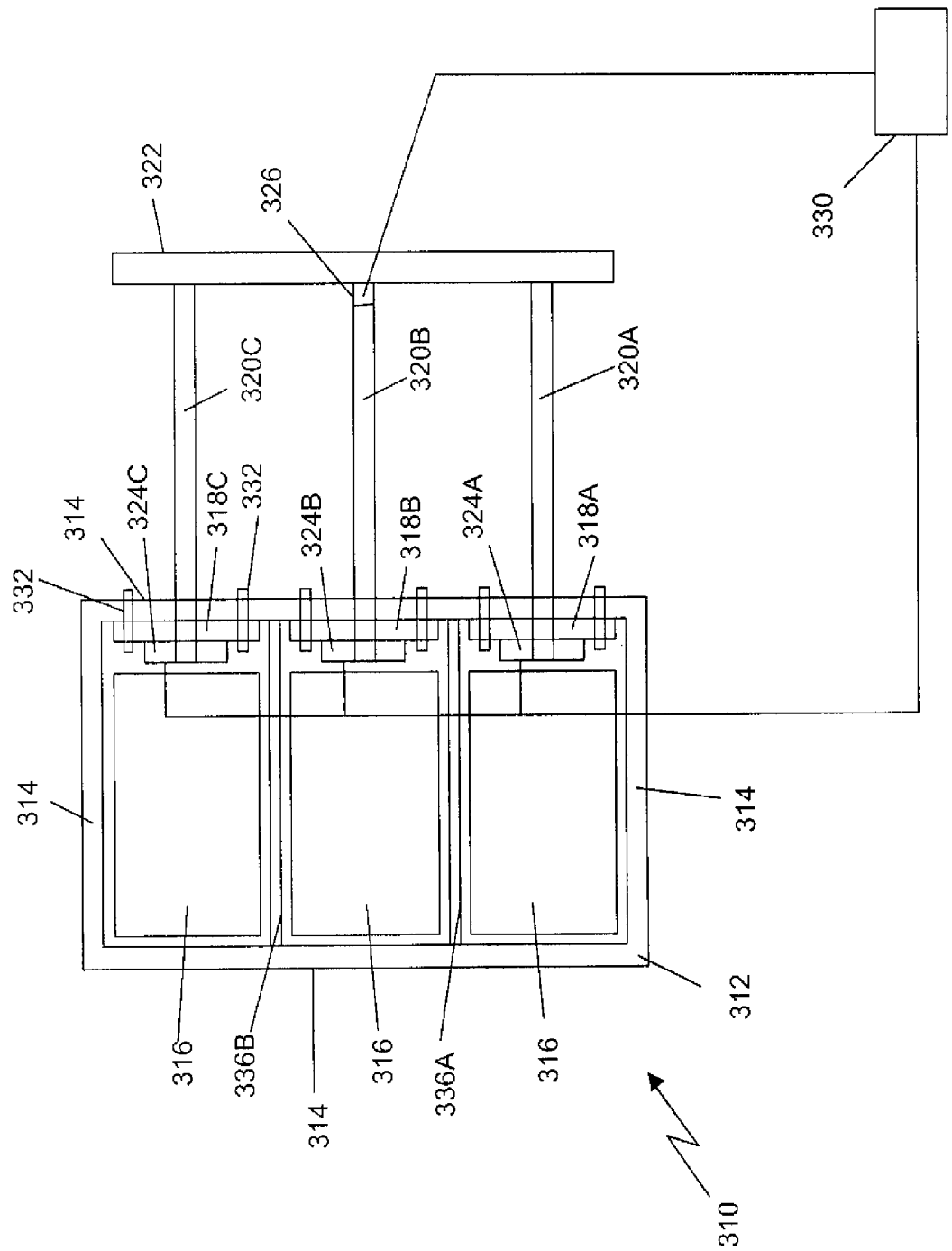
FIG. 4A is a cross-sectional illustration of an energy absorbing system, in accordance with a fourth exemplary embodiment of the present disclosure.

FIG. 4A is a cross-sectional illustration of an energy absorbing system 310, in accordance with a fourth exemplary embodiment of the present disclosure. A container 312 is formed with a first plurality of faces 314. The container 312 includes a first partition 336A and a second partition 336B partitioning three sections within the container 312. An energy absorbing material 316 is within each section of the containers 312. A first plate 318A is located within the first section of the container 312. A second plate 318B is located within the second section of the container 312. A third plate 318C is located within the third section of the container 312. A first elongated member 320A having a proximate end and a distal end is located with the proximate end of the first elongated member 320A proximate to the first plate 318A. A second elongated member 320B having a proximate end and a distal end is located with the proximate end of the second elongated member 320B proximate to the second plate 318B. A third elongated member 320C having a proximate end and a distal end is located with the proximate end of the third elongated member 320C proximate to the third plate 318C.

A first bumper 322 is integral with the distal end of the first elongated member 320A, the distal end of the second elongated member 320B, and the distal end of the third elongated member 320C. A first engagement mechanism 324A is proximate to the first plate 318A, wherein the first engagement mechanism 324A has a first position that fixes the first plate 318A to the first elongated member 320A and a second position that uncouples the first plate 318A from the elongated member 320A. A second engagement mechanism 324B is proximate to the second plate 318B, wherein the second engagement mechanism 324B has a first position that fixes the second plate 318B to the second elongated member 320B and a second position that uncouples the second plate 318B from the second elongated member 320B. A third engagement mechanism 324C is proximate to the third plate 318C, wherein the third engagement mechanism 324C has a first position that fixes the third plate 318C to the third elongated member 320C and a second position that uncouples the third plate 318C from the third elongated member 320C.

Sensor 326 is located proximate to the first bumper 322 to quantify a collision force on said first bumper 322. The sensor 326 communicates with the engagement mechanisms 324A-C through a processor 330 whereby the position of the engagement mechanisms 324A-C is dependent on a quantity of the collision force sensed. The container 312 is shown divided by partitions 336A-B. A span of the container 312 must be sufficiently limited to fit on a vehicle. The container 312 may have thicker faces 314 than partitions 336A-B. In some designs, the partitions 336A-B may be removed such that the energy absorbing material 316 is undivided. The energy absorbing material may be divided. The plates 318A-C may be secured to a face 314 of the container 312 with breakable bolts 332. The breakable bolts 332 may be constructed to break once a desired threshold of impact is achieved, thus avoiding compromising the energy absorbing system 310 through a series of inconsequential bumps to the bumper 322.

Figure 4C:
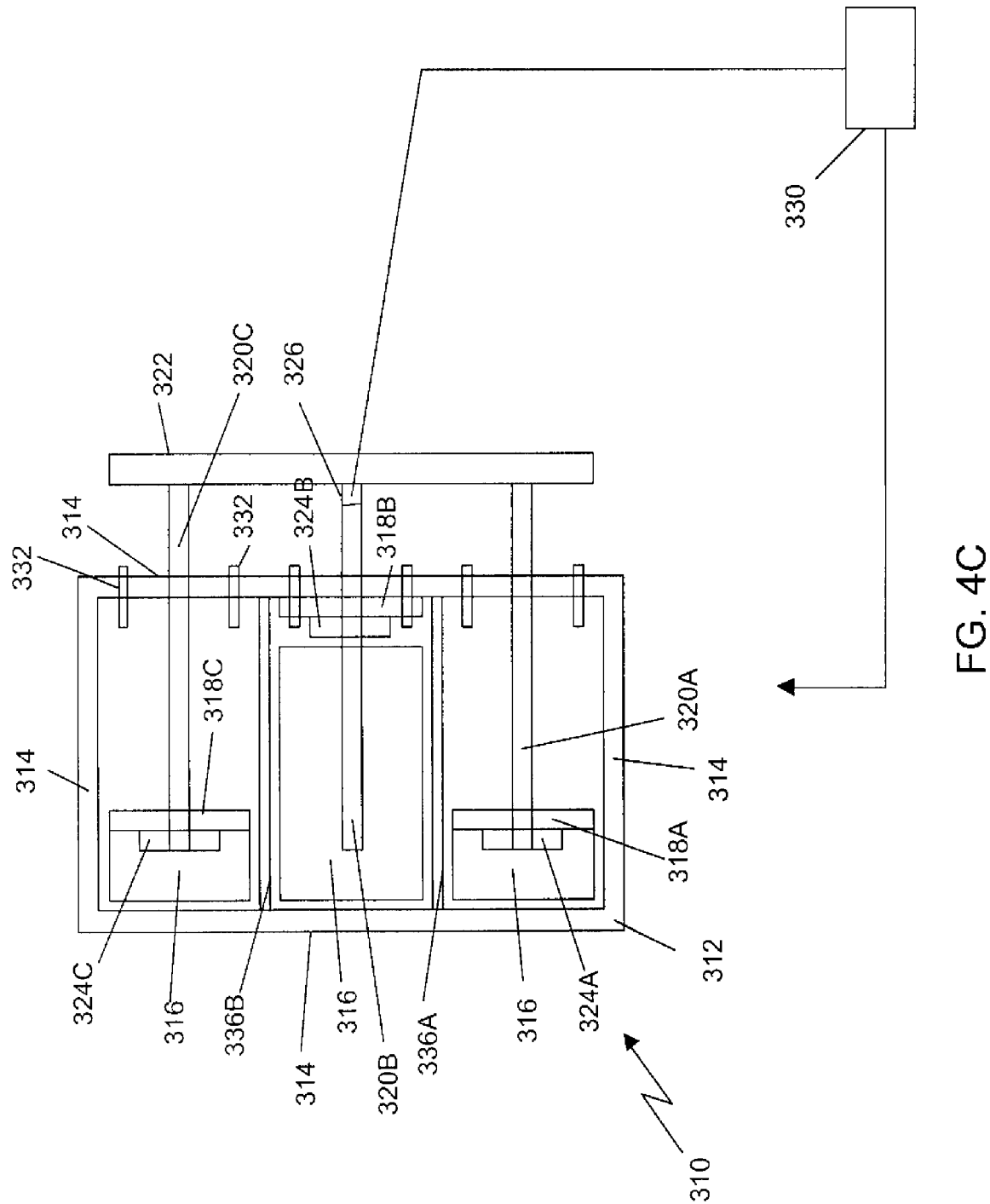
Figure 4D:
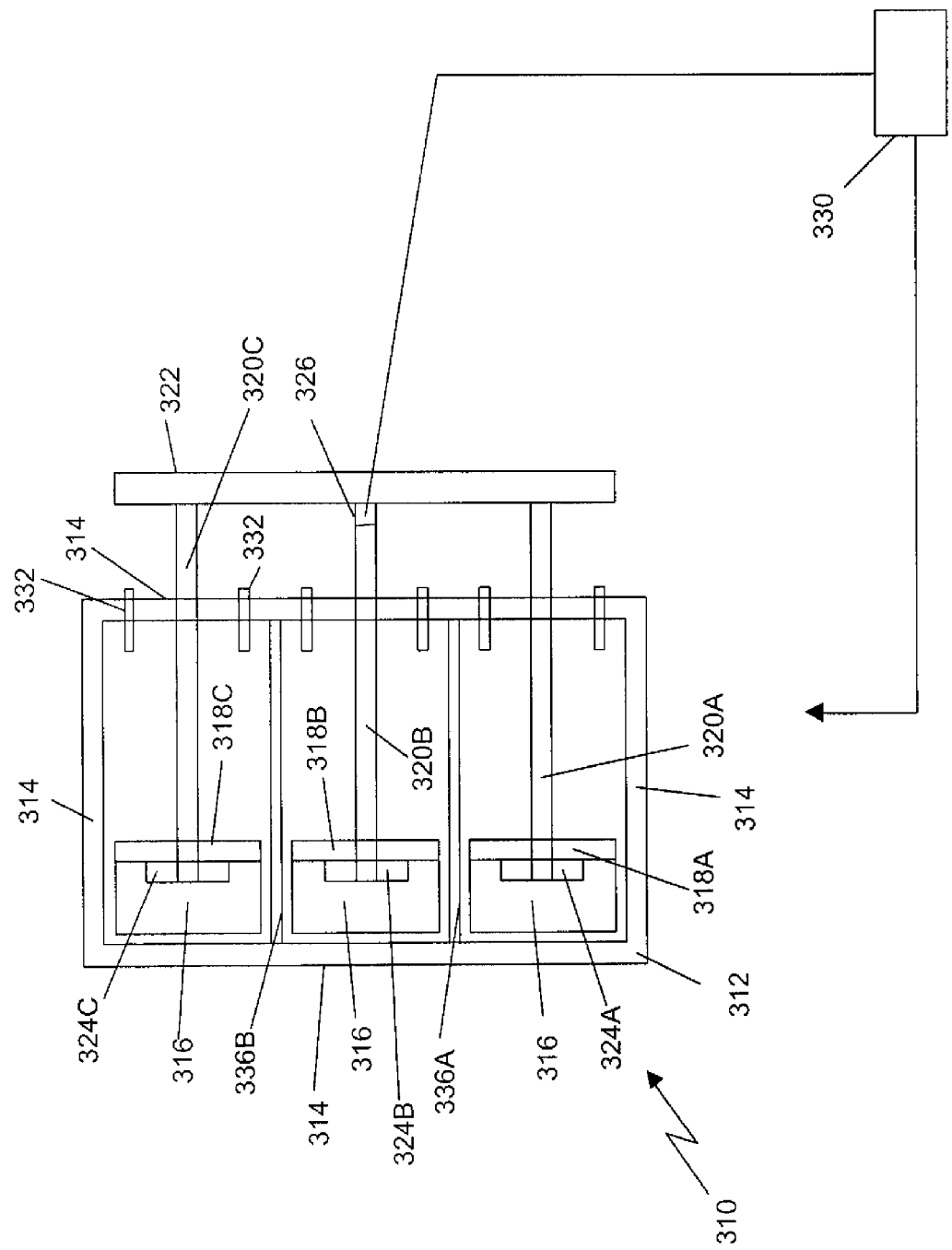

FIGS. 4B-4D are cross-sectional illustrations of the energy absorbing system of FIG. 4A in various possible permutations of post-crash positions, in accordance with the fourth exemplary embodiment of the present disclosure. As shown by a first permutation of post-crash positions illustrated in FIG. 4B, the sensor 326 communicated to the processor 330 sensed data that was indicative of a lower speed collision. The processor 330 communicated with the engagement mechanisms 324A-C such that the second engagement mechanism 324B was put in the first position fixed with the second plate 318B and the first and third engagement mechanisms 324A,C were put in the second position uncoupled from the first and third plates 318A,C. As a result, the energy absorbing material 316 before the second plate 318B is compressed while the first and third elongated members 320A,C bypassed the first and third plates 318A,C and passed through or formed a channel in the energy absorbing material 316.

As shown by a second permutation of post-crash positions illustrated in FIG. 4C, the sensor 326 communicated to the processor 330 sensed data that was indicative of higher speed collision. The processor 330 communicated with the engagement mechanisms 324A-C such that the second engagement mechanism 324B was put in the second position uncoupled with the second plate 318B and the first and third engagement mechanisms 324A,C were put in the first position fixed with the first and third plates 318A,C. As a result, the energy absorbing material 316 before the first and third plates 318A,C is compressed while the second elongated member 320B bypassed the second plate 318B and passed through or formed a channel in the energy absorbing material 316. The permutation illustrated in FIG. 4C would be appropriate for a higher impact collision than the permutation illustrated in FIG. 4B.

As shown by a third permutation of post-crash positions illustrated in FIG. 4D, the sensor 326 communicated to the processor 330 sensed data that was indicative of very high speed collision. The processor 330 communicated with the engagement mechanisms 324A-C such that all the engagement mechanisms 324A-C were put in the first position fixed with all the plates 318A-C. As a result, the energy absorbing material 316 within the container 312 is compressed by the plates 318A-C. The permutation illustrated in FIG. 4D would be appropriate for a higher impact collision than the permutation illustrated in FIG. 4C.

While FIGS. 4A-D shows all three plates 318A-C having engagement with the elongated members 320A-C controlled by the engagement mechanisms 324A-C, one of the three plates 318A-C may be fixed and/or integral with its respective elongated member 320A-C. For instance, it may not be desirable to ever have all three plates 318A-C uncoupled from the elongated members 320A-C at any given time. Thus, it may not be desirable to design all three plates 318A-C to be uncoupleable. One having ordinary skill in the art would understand how to make an integral connection between one of the plates 318A-C and one of the elongated members 320A-C.

FIG. 5 is a perspective illustration of a vehicle 308 having the energy absorbing system 310 illustrated in FIGS. 4A-4D, in accordance with the fourth exemplary embodiment of the present disclosure. The energy absorbing system 310 may be located on an underside of a vehicle 308, in a trunk of a vehicle 308, or elsewhere on a vehicle 308, as may be determined by those having ordinary skill in the art. The energy absorbing system 310 may be connected to the vehicle 308 during fabrication of the vehicle 308 or as an aftermarket safety product. As will be further described herein, the energy absorbing system 310 may include at least one container 312, at least one elongated member 320, and at least one bumper 322. The bumper 322 may be the bumper 322 provided with the vehicle 308 during manufacture or may be part of an aftermarket safety product.

Figure 6:
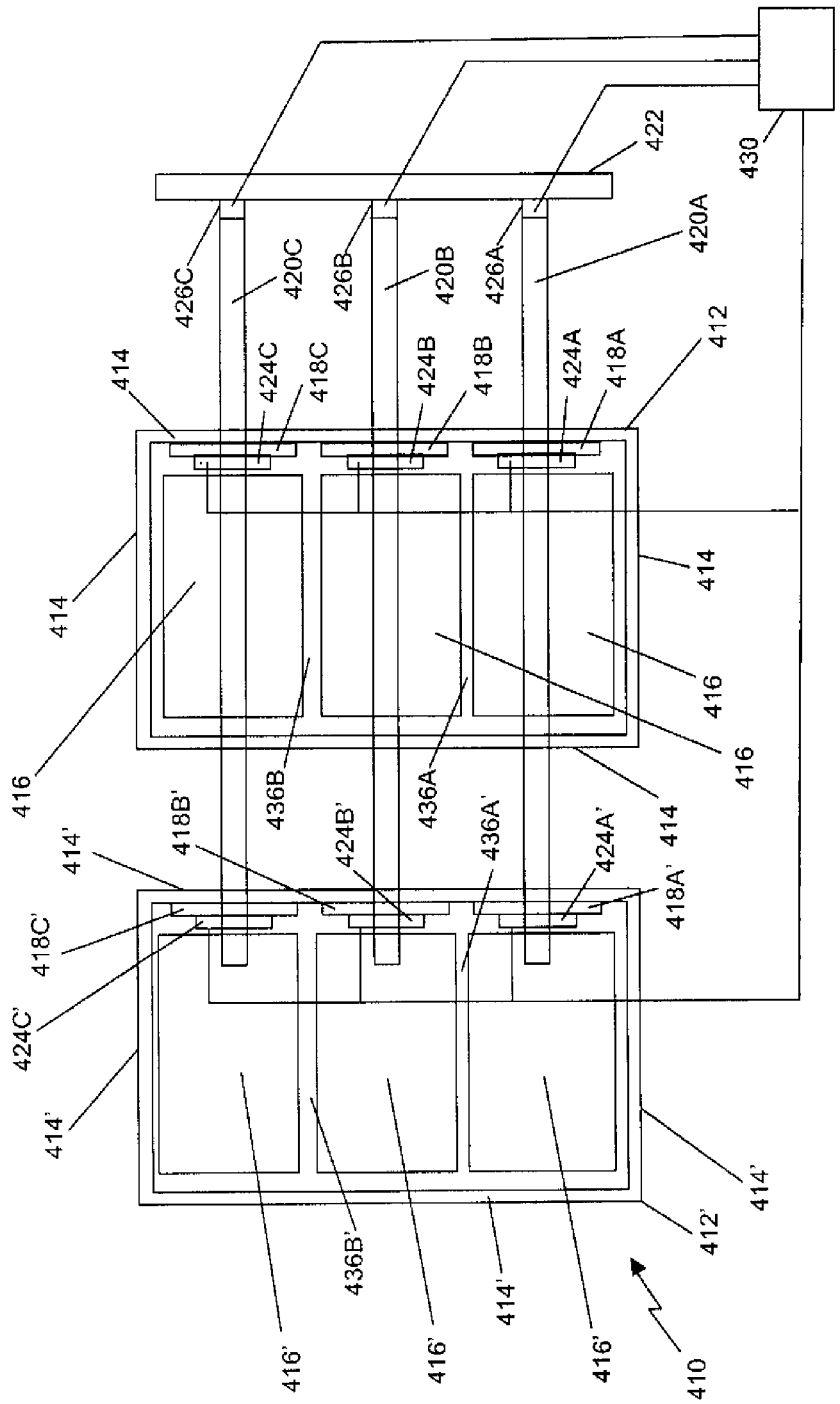
FIG. 6 is a cross-sectional illustration of an energy absorbing system, in accordance with a fifth exemplary embodiment of the present disclosure.

FIG. 6 is a cross-sectional illustration of an energy absorbing system 410, in accordance with a fifth exemplary embodiment of the present disclosure. A first container 412 is formed with a first plurality of faces 414. The first container 412 includes a first partition 436A and a second partition 436B partitioning three sections within the first container 412. An energy absorbing material 416 is within each section of the first container 412. A first plate 418A is located within the first section of the first container 412. A second plate 418B is located within the second section of the first container 412. A third plate 418C is located within the third section of the first container 412. A first elongated member 420A having a proximate end, a middle portion, and a distal end is located with the middle portion of the first elongated member 420A proximate to the first plate 418A. A second elongated member 420B having a proximate end, a middle portion, and a distal end is located with the middle portion of the second elongated member 420B proximate to the second plate 418B. A third elongated member 420C having a proximate end, middle portion and a distal end is located with the middle portion of the third elongated member 420C proximate to the third plate 418C.

A second container 412' is formed with a first plurality of faces 414'. The second container 412' includes a third partition 436A' and a fourth partition 436B' partitioning three sections within the second container 412'. An energy absorbing material 416' is within each section of the second container 412'. A fourth plate 418A' is located within the first section of the second container 412'. A fifth plate 418B' is located within the second section of the second container 412'. A sixth plate 418C' is located within the third section of the second container 412'. The first elongated member 420A is located with the proximate end of the first elongated member 420A proximate to the fourth plate 418A'. The second elongated member 420B is located with the proximate end of the second elongated member 420B proximate to the fifth plate 418B'. A third elongated member 420C is located with the proximate end of the third elongated member 420C proximate to the sixth plate 418C'.

A first bumper 422 is integral with the distal end of the first elongated member 420A, the distal end of the second elongated member 420B, and the distal end of the third elongated member 420C. A first engagement mechanism 424A is proximate to the first plate 418A, wherein the first engagement mechanism 424A has a first position that fixes the first plate 418A to the first elongated member 420A and a second position that uncouples the first plate 418A from the elongated member 420A. A second engagement mechanism 424B is proximate to the second plate 418B, wherein the second engagement mechanism 424B has a first position that fixes the second plate 418B to the second elongated member 420B and a second position that uncouples the second plate 418B from the second elongated member 420B. A third engagement mechanism 424C is proximate to the third plate 418C, wherein the third engagement mechanism 424C has a first position that fixes the third plate 418C to the third elongated member 420C and a second position that uncouples the third plate 418C from the third elongated member 420C. A fourth engagement mechanism 424A' is proximate to the fourth plate 418N, wherein the fourth engagement mechanism 424A' has a first position that fixes the fourth plate 418A' to the first elongated member 420A and a second position that uncouples the fourth plate 418A' from the first elongated member 420A. A fifth engagement mechanism 424B' is proximate to the fifth plate 418B', wherein the fifth engagement mechanism 424B' has a first position that fixes the fifth plate 418B' to the second elongated member 420B and a second position that uncouples the fifth plate 418B' from the second elongated member 420B. A sixth engagement mechanism 424C' is proximate to the sixth plate 418C', wherein the sixth engagement mechanism 424C' has a first position that fixes the sixth plate 418C' to the third elongated member 420C and a second position that uncouples the sixth plate 418C' from the third elongated member 420C.

Sensors 426A-C are located proximate to the first bumper 422 to quantify a collision force on said first bumper 422. Sensors 426A-C communicate with the engagement mechanisms 424A-C, 424A'-C' through a processor 430 whereby the position of the engagement mechanisms 424A-C, 424A'-C' is dependent on a quantity of the collision forces sensed. The containers 412, 412' are shown divided by partitions 436A-B, 436A'-B'. A span of the containers 412, 412' must be sufficiently limited to fit on a vehicle. The containers 412, 412' may have thicker faces 414, 414' than partitions 436A-B, 436A'-B'. In some designs, the partitions 436A-B, 436A'-B' may be removed such that the energy absorbing material 416 is undivided.

The energy absorbing system 410 in FIG. 6 may be designed such that the processor 430 may signal to fix anywhere from one to six of the plates 418A-C, 418A'-C' for any specific collision, thus providing a wide array of controllable options. Similar to other embodiments disclosed herein, the bumper 422 may be sectionalized into multiple bumper portions. The containers 412, 412' may be divided into as many as six different containers instead of two partitioned containers 412, 412'.

Figure 7:
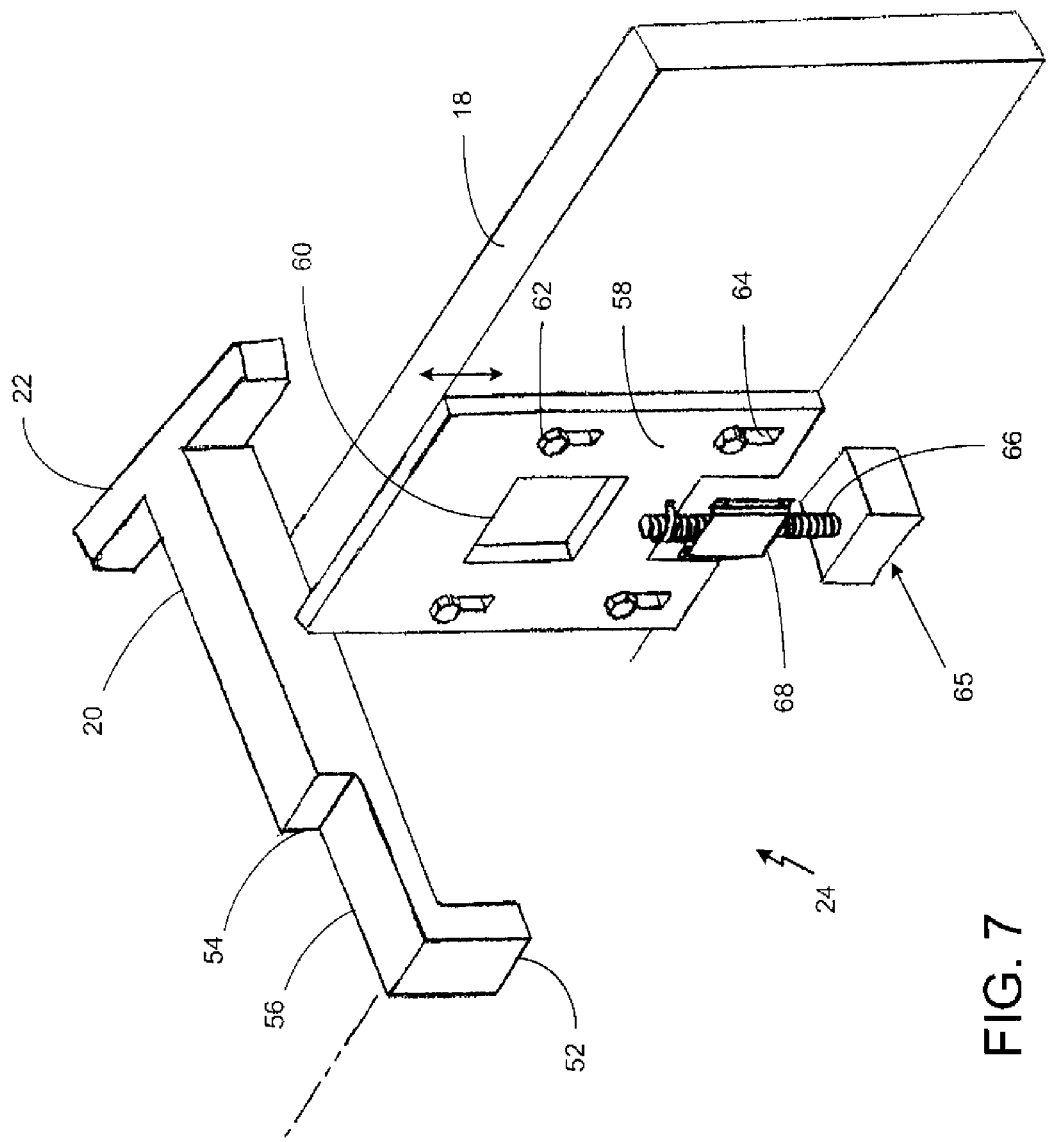
FIG. 7 is a perspective illustration of the engagement mechanism shown in FIG. 1A, in accordance with the first exemplary embodiment of the present disclosure.

FIG. 7 is a perspective illustration of the engagement mechanism 24 shown in FIG. 1A, in accordance with the first exemplary embodiment. The first elongated member 20 includes a first face 52, a second face 54, and a shaft tip 56 connecting the faces 52, 54. The first elongated member 20 traverses a stop plate 58, through a central slot 60 of the stop plate 58. The stop plate 58 is mounted to the first plate 18, in this exemplary embodiment, by four fasteners 62. The fasteners 62 sit within four peripheral stop plate slots 64 that allow the stop plate 58 to be slidably oriented to the first plate 18 by fast translation device 65 which connects to stop plate 58 by translation shaft 66.

Figure 8:
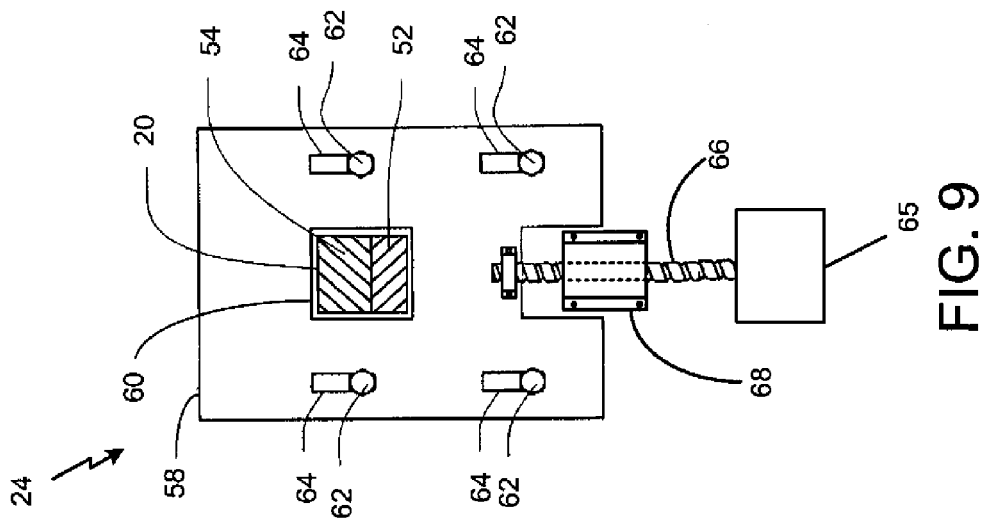
FIG. 8 is an illustration of a front view of the engagement mechanism shown in FIG. 7, in accordance with a first exemplary embodiment of the present disclosure.
Figure 9:
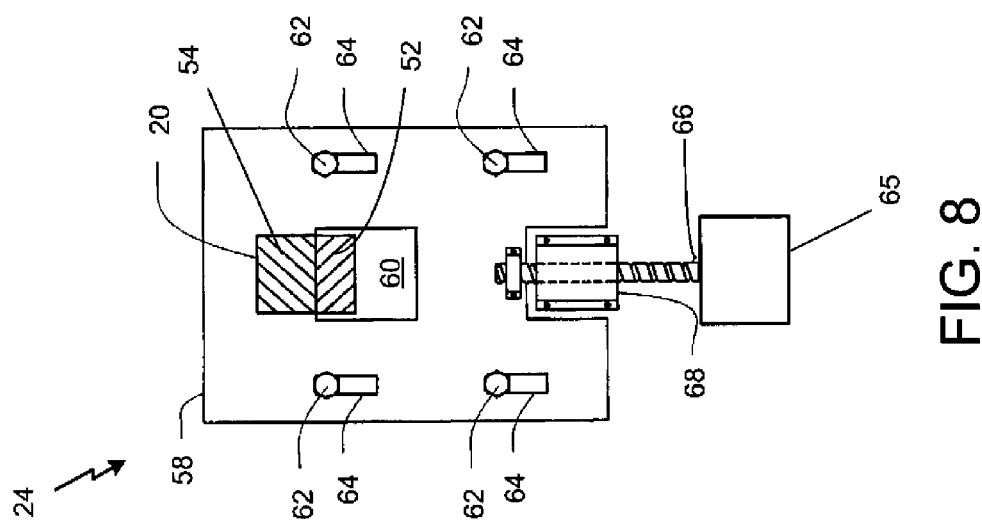
FIG. 9 is another illustration of a front view of the engagement mechanism shown in FIG. 7, in accordance with a first exemplary embodiment of the present disclosure.

FIG. 8 is an illustration of a front view of the engagement mechanism 24 shown in FIG. 7, in accordance with a first exemplary embodiment of the present disclosure. FIG. 9 is another illustration of a front view of the engagement mechanism 20 shown in FIG. 7, in accordance with a first exemplary embodiment of the present disclosure. FIG. 8 shows the stop plate 58 in the first, fixed position and FIG. 9 shows the stop plate 58 in the second, uncoupled position. The stop plate 58 may be raised and lowered with a fast translation device 65, which may be a high speed motor which is fastened to the first plate 18 by the bracket 68. The fast translation device 65 is connected to the stop plate 58 by the threaded translation shaft 66.

Since a faster collision gives the least time to move the fast translation device 65, it may be desirable to default the engagement mechanism to the coupled position. That is, the default position of FIG. 8 would be as shown where the elongated member 20 is blocked by the stop plate 58. In a slower collision, there is more time for the fast translation device 65 to move to a new position. In this case the fast translation device 65 quickly raises the translation shaft 66, which is rigidly attached to the stop plate 58, thereby raising the stop plate 58. For the stop plate 58 to be moved from the second position to the first position, the first elongated member 20 must be in an extended position such that the shaft tip is contained within the central slot 60. The second face 54 is thereby blocked by the upper solid region of stop plate 58.

When the engagement mechanism 24 is in the first or coupled position, if the bumper 22 (shown in FIG. 1A) is hit by another vehicle, the force of the collision is transmitted through the first elongated member 20 to the stop plate 58. The stop plate 58 prevents motion of the first elongated member 20 relative to the first plate 18. The second face 54 will be propelled into a back surface of the stop plate 58, which will pull on the first plate 18 via the fasteners 62. The first plate 18 will be propelled further into the container 12 along with the stop plate 58 and other elements mounted on the first plate 18.

FIG. 10 is an illustration of a front view of an engagement mechanism 124A similar to that shown in FIG. 7, in accordance with a second exemplary embodiment of the present disclosure. FIG. 10 shows an explosive version of the fast translation device 165A. The engagement mechanism 124A includes a chamber 180A housing a piston 182A connected to the stop plate 158A by the translation shaft 166A and maintaining the stop plate 158A and, thus, the first plate (not shown) in a first position. Also contained within the chamber 180A is an explosive material 184A and an ignition element 186A in communication with the processor 130A. When signaled by the processor 130A, the ignition element 186A ignites the explosive material 184A to thrust the piston 182A to the other side of the chamber 180A, moving the stop plate 158A and, thus, the first plate into the second position, thereby allowing the first elongated member 120A to pass without disturbing the first plate. The chamber 180A, the piston 182A, and the explosive material 184A should be coordinated so that ignition of the explosive material 184A is able to move the stop plate 158A without doing significant damage to an area about the chamber 180A.

FIG. 11 is an illustration of a front view of an engagement mechanism 124B similar to that shown in FIG. 7, in accordance with a first exemplary embodiment of the present disclosure. FIG. 11 shows a magnetic version of the fast translation device 165B. The engagement mechanism 124B includes a chamber 180B housing an electromagnet 182B connected to the stop plate 158B by the translation shaft 166B and maintaining the stop plate 158B and, thus, the second plate (not shown) in a first position. Also contained within the chamber 180B is a permanent magnet 184B. An electromagnet controller 186B is in communication with the processor 130B and controlling the electromagnet 182B. When signaled by the processor 130A, the electromagnet controller 186B supplies a current to the electromagnet 182B to repel the electromagnet 182B from the permanent magnet 184B thrust the electromagnet 182B to the other side of the chamber 180B, moving the stop plate 158B and, thus, the second plate into the second position, thereby allowing the second elongated member 120B to pass without disturbing the second plate.

FIGS. 7-11 illustrate various translation device embodiments for moving the stop plates and they are just a sample of a myriad of possible ways of moving the stop plates. Various technologies exist for the quick translation of objects beyond those disclosed herein and all such technologies are considered to be within the scope of the present disclosure.

Figure 12:
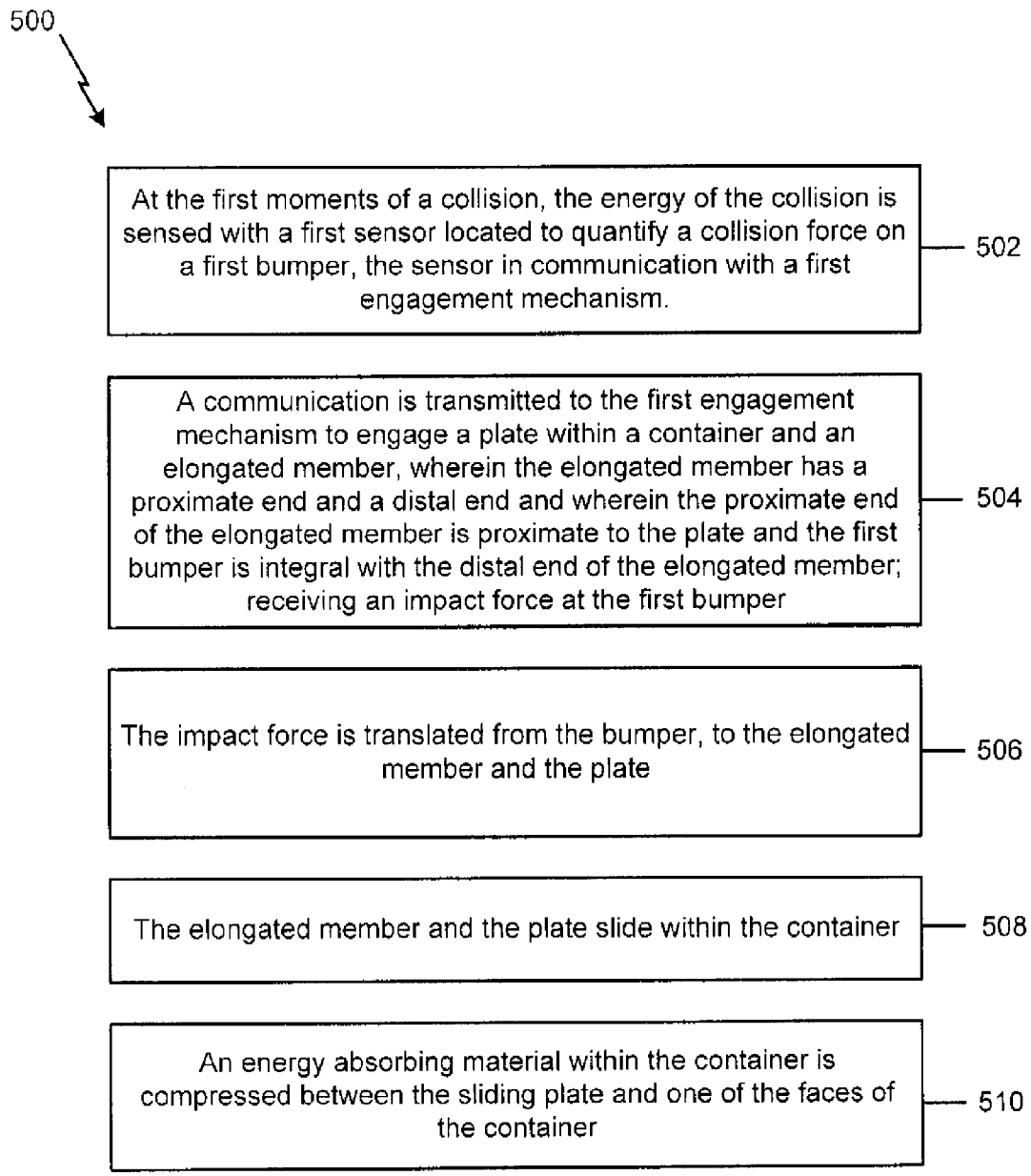
FIG. 12 is a flowchart illustrating a method for absorbing impact energy, in accordance with the first exemplary embodiment of the disclosure.

FIG. 12 is a flowchart 500 illustrating a method of absorbing impact energy, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, at the first moments of a collision, the energy of the collision is sensed with a first sensor located to quantify a collision force on a first bumper, the sensor in communication with a first engagement mechanism. A communication is transmitted to the first engagement mechanism to engage a plate within a container and an elongated member, wherein the elongated member has a proximate end and a distal end and wherein the proximate end of the elongated member is proximate to the plate and the first bumper is integral with the distal end of the elongated member; receiving an impact force at the first bumper (block 504). The impact force is translated from the bumper, to the elongated member and the plate (block 506). The elongated member and the plate slide within the container (block 508). An energy absorbing material within the container is compressed between the sliding plate and one of the faces of the container (block 510).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. An energy absorbing system, comprising:
a container formed with a plurality of faces;
an energy absorbing material within the container;
an elongated member wherein the elongated member has a length dimension substantially greater than a height dimension and a width dimension, the elongated member having a proximate end and a distal end, the proximate end of the elongated member proximate to a plate;
the plate located within the container, the plate proximate and approximately perpendicular to the proximate end of the elongated member, said plate positioned to compress the energy absorbing material;
a first bumper proximate to the distal end of the elongated member;
a first engagement mechanism proximate to the plate, wherein the engagement mechanism has a first position that fixes the plate to the elongated member and a second position that uncouples the plate from the elongated member; and
a first sensor located to quantify a collision force on said first bumper, the sensor in communication with the first engagement mechanism whereby the position of the engagement mechanism is dependent on a quantity of the collision force sensed.
a second plate located within the container;
a second elongated member having a proximate end and a distal end, the proximate end of the second elongated member integral with the second plate; and
the first bumper proximate to the distal end of the second elongated member.

2. The system of claim 1 further comprising
a second plate located within the container;
a second elongated member having a proximate end and a distal end, the proximate end of the second elongated member integral with the second plate; and
the first bumper proximate to the distal end of the second elongated member.

3. The system of claim 1 further comprising
a second plate located within the container;
a second elongated member having a proximate end and a distal end, the proximate end of the second elongated member proximate to the second plate;
the first bumper proximate to the distal end of the second elongated member;
a second engagement mechanism proximate to the second plate, wherein the engagement mechanism has a first position that fixes the plate to the second elongated member and a second position that uncouples the plate from the second elongated member; and
the at least one sensor located to quantify a collision force on said bumper, the sensor in communication with first and second engagement mechanisms whereby the positions of the engagement mechanisms are dependent on a quantity of the collision force sensed.

4. The system of claim 1 further comprising
a second container formed with a plurality of faces containing an energy absorbing
a second plate located within the second container;
a second elongated member having a proximate end and a distal end, the proximate end of the second elongated member integral with the second plate; and
the first bumper proximate to the distal end of the second elongated member.

5. The system of claim 1 further comprising a second container formed with a plurality of faces containing an energy absorbing material;
a second plate located within the second container;
a second elongated member having a proximate end and a distal end, the proximate end of the second elongated member proximate to the second plate,
an second engagement mechanism proximate to the second plate, wherein the engagement mechanism has a first position that fixes the plate to the second elongated member and a second position that uncouples the plate from the second elongated member, the first bumper proximate to the distal end of the second elongated member,
and the at least one sensor located to quantify a collision force on said bumper, the sensor in communication with first and second engagement mechanisms whereby the positions of the engagement mechanisms are dependent on a quantity of the collision force sensed.

6. The system of claim 1 further comprising
a second plate located within the container;
a second elongated member having a proximate end and a distal end,
the proximate end of the second elongated member proximate to the second plate;
a second bumper proximate to the distal end of the second elongated member;
a second engagement mechanism proximate to the second plate, wherein the engagement mechanism has a first position that fixes the plate to the second elongated member and a second position that uncouples the plate from the second elongated member; and
the at least one sensor located to quantify a collision forces on said first and second bumpers, the sensor in communication with first and second engagement mechanisms whereby the positions of the engagement mechanisms are dependent on a quantity of the collision force sensed.

7. The system of claim 6 further comprising a partition formed within the container, wherein the partition divides the energy absorbing material into two distinguishable masses.

8. The system of claim 1 further comprising
a second plate located within the container;
a second elongated member having a proximate end and a distal end, the proximate end of the second elongated member integral with the second plate; and
a second bumper proximate to the distal end of the second elongated member.

9. The system of claim 1 further comprising
a second container formed with a plurality of faces containing an energy absorbing material;
a second plate located within the second container;
a second elongated member having a proximate end and a distal end, the proximate end of the second elongated member proximate to the second plate, a second engagement mechanism proximate to the second plate, wherein the engagement mechanism has a first position that fixes the plate to the second elongated member and a second position that uncouples the plate from the second elongated member, a second bumper proximate to the distal end of the second elongated member, and the least one sensor located to quantify collision forces on said first and second bumpers, the sensor in communication with first and second engagement mechanisms whereby the position of the engagement mechanisms are dependent on a quantity of the collision force sensed.

10. The system of claim 1 further comprising
a second container formed with a plurality of faces containing an energy absorbing material;
a second plate located within the second container;
a second elongated member having a proximate end and a distal end, the proximate end of the second elongated member integral with the second plate; and
a second bumper proximate to the distal end of the second elongated member.

11. The system of claim 1 further comprising
a second plate located within the container; the second plate associated with a separate volume of energy absorbing material,
a second elongated member having a proximate end and a distal end, the proximate end of the second elongated member integral with the second plate; and
the first bumper proximate to the distal end of the second elongated member.

12. The system of claim 1 further comprising
a second plate located within the container;
the second plate associated with a separate volume of energy absorbing material,
a second elongated member having a proximate end and a distal end,
the proximate end of the second elongated member proximate to the second plate;
the first bumper proximate to the distal end of the second elongated member;
a second engagement mechanism proximate to the second plate, wherein the engagement mechanism has a first position that fixes the second plate to the second elongated member and a second position that uncouples the plate from the second elongated member; and
the at least one sensor located to quantify a collision force on said bumper, the sensor in communication with first and second engagement mechanisms whereby the positions of the engagement mechanisms are dependent on a quantity of the collision force sensed.

13. The system of claim 1 further comprising a vehicle to which the container is fixed.

14. The energy absorbing system of claim 1,
wherein a middle portion of the first elongated member extends through a second container,
the second container formed with a second plurality of faces;
a second energy absorbing material within the second container;
a second plate located within the second container;
said second plate proximate to the middle portion of the elongated member;
a second engagement mechanism proximate to the second plate, wherein the second engagement mechanism has a first position that fixes the second plate to the middle portion of the elongated member and a second position that uncouples the second plate from the middle portion of the elongated member;
the second engagement mechanism in communication with the sensor whereby a position of the second engagement mechanism is dependent on the quantity of the collision force sensed.

15. The system of claim 1 wherein the plate is connected to one of the faces of the container with at least one breakable bolt.

16. The system of claim 1 further comprising:
a second plate located within the container;
a second elongated member having a proximate end and a distal end,
the proximate end of the second elongated member proximate to the second plate;
a second bumper proximate to the distal end of the second elongated member;
a second engagement mechanism proximate to the second plate, wherein the engagement mechanism has a first position that fixes the plate to the second elongated member and a second position that uncouples the plate from the second elongated member; and
a second sensor located to quantify a collision force on said second bumper, the first and second sensors in communication with a processor, whereby said processor determines the position of the first and second engagement mechanisms dependent on the quantity of the collision force sensed by the first and second sensors.

17. The system of claim 1 further comprising:
a second container formed with a plurality of faces containing an energy absorbing material;
a second plate located within the second container;
a second elongated member having a proximate end and a distal end, the proximate end of the second elongated member proximate to the second plate,
a second engagement mechanism proximate to the second plate, wherein the engagement mechanism has a first position that fixes the plate to the second elongated member and a second position that uncouples the plate from the second elongated member, a second bumper proximate to the distal end of the second elongated member,
a second sensor located to quantify a collision force on said second bumper, the first and second sensors in communication with a processor, whereby said processor determines the position of the first and second engagement mechanisms dependent on the quantity of the collision force sensed by the first and second sensors.

18. A method of absorbing energy in a collision, the method comprising the steps of:
sensing a first moment of a collision with a first sensor located to quantify a collision force on a first bumper, the sensor in communication with a first engagement mechanism;
communicating to the first engagement mechanism to engage a plate within a container and an elongated member, wherein the elongated member has a proximate end and a distal end and wherein the proximate end of the elongated member is proximate to the plate and the first bumper is proximate to the distal end of the elongated member;
receiving an impact force at the first bumper;
translating the impact force from the bumper, to the elongated member and the plate;

sliding the proximate end of the elongated member and the plate within the container when the first engagement mechanism is in both the first position and the second position; and compressing an energy absorbing material within the container between the sliding plate and one of the faces of the container when the first engagement mechanism is in the first position whereby the plate is fixed to the elongate member.

19. The method of claim 18, further comprising the steps of:

receiving the signal from the sensor at a processor and communicating to the first engagement mechanism from the processor;

communicating to a second engagement mechanism from the processor;

engaging a second elongated member and a second plate with the second engagement mechanism as a result of the communication to the second engagement member, wherein the second elongated member is proximate to the first bumper.

20. The method of claim 18, further comprising the steps of:

receiving the signal from the sensor at a processor and communicating to the first engagement mechanism from the processor;

communicating to a second engagement mechanism from the processor;

disengaging a second elongated member and a second plate with the second engagement mechanism as a result of the communication to the second engagement member, wherein the second elongated member is proximate to the first bumper.

* * * * *

UNITED STATES PATENT AND TRADEMARK OFFICE
CERTIFICATE OF CORRECTION

PATENT NO.         : 8,016,332 B1                                    Page 1 of 1
APPLICATION NO.    : 12/977858
DATED              : September 13, 2011
INVENTOR(S)        : Shoap It is certified that error appears in the above-identified patent and that said Letters Patent is hereby corrected as shown below:

Col. 16, Claim 3, Line 3, after "absorbing", insert --material;--.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,016,332 B1 | Page 1 of 1 |
| APPLICATION NO. | : 12/977858 | |
| DATED | : September 13, 2011 | |
| INVENTOR(S) | : Shoap | |

It is certified that error appears in the above-identified patent and that said Letters Patent is hereby corrected as shown below:

Column 16, Line 6 (Claim 4, Line 3) after "absorbing", insert --material;--.

This certificate supersedes the Certificate of Correction issued April 10, 2012.

Signed and Sealed this
First Day of May, 2012

David J. Kappos
*Director of the United States Patent and Trademark Office*